(12) United States Patent
Sugino et al.

(10) Patent No.: US 11,598,453 B2
(45) Date of Patent: Mar. 7, 2023

(54) THREADED CONNECTION FOR STEEL PIPE

(71) Applicants: NIPPON STEEL & SUMITOMO METAL CORPORATION, Tokyo (JP); VALLOUREC OIL AND GAS FRANCE, Aulnoye-Aymeries (FR)

(72) Inventors: Masaaki Sugino, Nishinomiya (JP); Tatsuya Yamamoto, Singapore (SG); Yukihiro Nishikawa, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 855 days.

(21) Appl. No.: 14/915,481

(22) PCT Filed: Sep. 4, 2014

(86) PCT No.: PCT/JP2014/073318
§ 371 (c)(1),
(2) Date: Feb. 29, 2016

(87) PCT Pub. No.: WO2015/033997
PCT Pub. Date: Mar. 12, 2015

(65) Prior Publication Data
US 2016/0208962 A1 Jul. 21, 2016

(30) Foreign Application Priority Data
Sep. 6, 2013 (JP) .............................. JP2013-184717

(51) Int. Cl.
*F16L 15/00* (2006.01)
*E21B 17/042* (2006.01)

(52) U.S. Cl.
CPC .......... *F16L 15/004* (2013.01); *E21B 17/042* (2013.01); *E21B 17/0423* (2013.01)

(58) Field of Classification Search
CPC ... F16L 15/004; E21B 17/042; E21B 17/0423
USPC .................................................. 285/333–334
See application file for complete search history.

(56) References Cited

U.S. PATENT DOCUMENTS 1,927,656 A * 9/1933 Eaton ..................... E21B 17/042
285/334
4,410,204 A * 10/1983 Reimert ................. E21B 17/042
285/27

(Continued)

FOREIGN PATENT DOCUMENTS

CA 2807087 A1 * 3/2012 .............. F16L 15/06
CN 201273426 Y 7/2009

(Continued)

OTHER PUBLICATIONS

Chinese Office Action and Search Report, dated Oct. 9, 2016, for counterpart Chinese Application No. 201480048583.3, with an English translation of the Search Report.

(Continued)

*Primary Examiner* — Matthew Troutman
*Assistant Examiner* — Fannie C Kee
(74) *Attorney, Agent, or Firm* — Birch, Stewart, Kolasch & Birch, LLP

(57) ABSTRACT

A threaded connection for a steel pipe includes a box which is an opening end of a second pipe and a truncated cone shaped pin which is an end of a first pipe and is inserted into the box, wherein the pin includes a male thread portion which is a tapered thread and a seal portion which includes a tapered surface, the box includes a female thread portion which is a tapered thread and a seal portion which includes a tapered surface, and in a state before make-up between the (Continued)

pin and the box, a minimum diameter of the tapered surface of the pin is smaller than a maximum diameter of the tapered surface of the box.

9 Claims, 17 Drawing Sheets

(56) References Cited

U.S. PATENT DOCUMENTS

| | | | |
|---|---|---|---|
| 4,521,042 A | | 6/1985 | Blackburn et al. |
| 4,577,895 A | * | 3/1986 | Castille ............... E21B 17/0423 285/334 |
| 4,601,491 A | * | 7/1986 | Bell, Jr ................. E21B 17/042 285/24 |
| 4,610,467 A | * | 9/1986 | Reimert ............... E21B 17/042 285/27 |
| 4,828,295 A | | 5/1989 | Plaquin et al. |
| 5,649,725 A | | 7/1997 | Nagasaku et al. |
| 5,788,401 A | * | 8/1998 | Drenth ................. E21B 17/042 403/353 |
| 6,349,979 B1 | | 2/2002 | Noel et al. |
| 8,029,025 B1 | | 10/2011 | Sivley, IV et al. |
| 2002/0074799 A1 | * | 6/2002 | Watts .................... E21B 17/042 285/397 |
| 2003/0159764 A1 | | 8/2003 | Goto et al. |
| 2005/0248153 A1 | | 11/2005 | Sugino et al. |
| 2008/0191479 A1 | | 8/2008 | Suzuki |
| 2008/0277925 A1 | | 11/2008 | Goto et al. |
| 2013/0181442 A1 | | 7/2013 | Sonobe et al. |
| 2014/0262213 A1 | * | 9/2014 | Delange ............... F16L 15/004 166/207 |
| 2014/0284919 A1 | | 9/2014 | Goto et al. |

FOREIGN PATENT DOCUMENTS

| | | | |
|---|---|---|---|
| EP | 1 387 036 B1 | 4/2007 | |
| GB | 2099529 A | * 12/1982 | ........... E21B 17/042 |
| JP | 8-135855 A | 5/1996 | |
| JP | 2002-527696 A | 8/2002 | |
| JP | 2005-351324 A | 12/2005 | |
| JP | 2007-205361 A | 8/2007 | |
| JP | 2011-106627 A | 6/2011 | |
| JP | 2012-506000 A | 3/2012 | |
| JP | 2012-149760 A | 8/2012 | |
| JP | 2012-241863 A | 12/2012 | |
| JP | 2013-511672 A | 4/2013 | |
| JP | 2013-108556 A | 6/2013 | |
| RU | 2258170 C2 | 8/2005 | |
| RU | 2326285 C1 | 6/2008 | |
| SU | 1575950 A3 | 6/1990 | |
| WO | WO 2006/022418 A1 | 3/2006 | |
| WO | WO 2010/047406 A1 | 4/2010 | |
| WO | WO 2011/060894 A2 | 5/2011 | |

OTHER PUBLICATIONS

Russian Notice of Allowance issued in Russian Application No. 2016107380 dated Oct. 2, 2017, together with an English translation.

International Search Report, issued in PCT/JP2014/073318, dated Dec. 9, 2014.

Written Opinion of the International Searching Authority, issued in PCT/JP2014/073318(PCT/ISA/237), dated Dec. 9, 2014.

Extended European Search Report, dated Apr. 11, 2017, for corresponding European Application No. 14842200.9.

* cited by examiner

THREADED CONNECTION FOR STEEL PIPE

TECHNICAL FIELD OF THE INVENTION

The present invention relates to a threaded connection for a steel pipe.

Priority is claimed on Japanese Patent Application No. 2013-184717, filed on Sep. 6, 2013, the content of which is incorporated herein by reference.

RELATED ART

In an oil well or a natural gas well (hereinafter, collectively referred to as an "oil well"), as oil-well pipes such as a casing or tubing, steel pipes which are sequentially connected by threaded connections are used. In general, in this kind of threaded connection, a connection having only a tapered thread defined by the American Petroleum Institute standard is applied. The threaded connection is configured of a first pipe having a tapered male thread portion and a second pipe having a tapered female thread portion. The male thread portion of the first pipe is screwed into the female thread portion of the second pipe, and thus, the first pipe and the second pipe are connected to each other.

Threaded connections for a steel pipe are roughly classified into two types: a coupling type and an integral type. In a case of the coupling type, the first pipe is a steel pipe and the second pipe is a coupling (short pipe). In this case, male thread portions are formed on both end portions of the steel pipe, and female thread portions are formed on both end portions of the coupling. That is, in the coupling type, steel pipes adjacent to each other are connected to each other via the coupling.

Meanwhile, in a case of the integral type, both the first pipe and the second pipe are steel pipes, and the coupling is not used. In this case, the male thread portion is formed on one end portion of the steel pipe, and the female thread portion is formed on the other end portion. That is, in the integral type, the steel pipes adjacent to each other are directly connected to each other without using the coupling.

In general, the connection portion of the first pipe on which the male thread portion is formed includes an element inserted into the female thread portion, and thus, is referred to as a pin. Meanwhile, the connection portion of the second pipe on which the female thread portion is formed includes an element receiving the male thread portion, and thus, is referred to as a box. Hereinafter, the connection portion including the male thread portion is also referred to as the pin, and the connection portion including the female thread portions is also referred to as the box.

In the threaded connection for a steel pipe, the male thread portion of the pin is screwed into the female thread portion of the box, and the male thread portion and the female thread portion are fitted in close contact with each other. In this way, in the threaded connection of the API standard which does not have a sealing surface (threadless surface), the male thread portion and the female thread portion are fitted in contact with each other, and thus, the sealing performance and pressure resistance of the threaded connection are secured.

In recent years, according to an increase in depth and severity of circumstances of oil wells in which the threaded connection is used, particularly, in a threaded connection of a steel pipe having a large diameter used in a casing, a more improved sealing performance and pressure resistance are required. Accordingly, the threadless surface (sealing surface) is provided on an outer surface of the pin and an inner surface of the corresponding box, and a metal touch seal which fits the sealing surfaces is widely used as a sealing mechanism.

In the metal touch seal, an outer diameter of the pin is set to be slightly larger than an inner diameter of the box (this diameter difference is referred to as a "seal interference amount"). In the metal touch seal, the pin and the box are fitted and interfere with each other in a radial direction, and an elastic recovery force to return to the original diameter is generated between the box in which the diameter is increased and the pin in which the diameter is decreased. The elastic recovery force causes the sealing surface to tightly come into close contact with sealing surfaces.

In order to improve the sealing performance and the pressure resistance, threaded connections disclosed in Patent Documents 1 to 3 are suggested.

For example, in a threaded connection for a pipe disclosed in Patent Document 1, a seal portion is provided at a position away from a nose tip, a nose portion extends from the seal portion to a shoulder portion (abutment surface), and thus, the sealing performance and the pressure resistance are improved.

In threaded connections for a steel pipe disclosed in Patent Documents 2 and 3, a first pipe (pin) and a second pipe (box) include tapered threads (male thread portion and female thread portion) which are fitted in close contact with each other, and a sealing surface and an abutment surface. Accordingly, in the threaded connections for a steel pipe disclosed in Patent Documents 2 and 3, the sealing surfaces of the pin and the box tightly come into contact with each other according to screwing of the pin, and a seal (metal touch seal) by a metal contact is formed. In addition, the abutment surfaces of the pin and the box abut into contact with each other according to the screwing of the pin, and the abutment surfaces take a role of a stopper which limits the screwing of the pin, and a role of applying a load in a direction opposite to a screwing direction, that is, a so-called make-up axial force of a thread to the male thread portion.

CITATION LIST

Patent Document

[Patent Document 1] Japanese Unexamined Patent Application, First Publication No. 2012-149760

[Patent Document 2] PCT International Publication No. WO 2011/060894

[Patent Document 3] Japanese Unexamined Patent Application, First Publication No. 2012-506000

SUMMARY OF THE INVENTION

Problems to be Solved by the Invention

At a site of an oil well, when two pipes are connected to each other, a pin is screwed into a box using a make-up device referred to as a power tongue. At this time, since a make-up torque and a screwing state (an increase in the number of make-up turns) are in a relationship shown in FIG. 8, the screwing state of the pin to the box (a state of the make-up between the pin and the box) is understood by observing (measuring) the make-up torque required for the screwing.

When the screwing of the pin to the box is normally performed, as shown in FIG. 8, the make-up torque is smoothly and monotonously increased according to the screwing state (the increase in the number of make-up turns). Moreover, the abutment surfaces abut into contact with each other immediately before the screwing is completed, and thus, the make-up torque is abruptly increased (this is referred to as shouldering).

Meanwhile, when abnormality such as galling occurs in a process of the screwing, the make-up torque is excessively increased before the shouldering is occurred.

In the threaded connection for a pipe disclosed in Patent Document 1, the seal surfaces of the pin and the box slide while coming into contact with each other at a narrow contact width and a high average contact pressure in a process in which the threaded connection is screwed and made-up, and thus, occurrence of galling is not easily prevented. In addition, in the threaded connections for a steel pipe disclosed in Patent Documents 2 and 3, even when the screwing of the pin to the box is normally performed, the make-up torque is excessively increased or irregularly changed (so-called humping of the make-up torque occurs) in the process of the screwing.

FIG. 10 shows a schematic view showing a relationship between the number of make-up turns and the make-up torque when the humping of the make-up torque is occurred. As shown in FIG. 10, if the humping of the make-up torque is occurred in the process of screwing the pin, it is difficult to correctly understand the screwing state of the pin. Accordingly, it may be determined that the screwing is completed at the time of occurrence of the humping. If the completion of the screwing is erroneously determined, the screwing is not sufficient, and there is a concern that the connection between the first pipe and the second pipe may be incomplete.

Accordingly, the present invention has been made in consideration of the above-described circumstances, and an object thereof is to provide a threaded connection for a steel pipe capable of preventing humping of a make-up torque which is occurred when a pin and a box are made-up.

Means for Solving the Problem

In order to solve the above-described problems, the present invention adopts the following.

(1) According to a first aspect of the present invention, there is provided a threaded connection for a steel pipe, which connects a first pipe and a second pipe, the threaded connection including: a box which is an opening end of the second pipe; and a truncated cone shaped pin which is an end of the first pipe and is inserted into the box, wherein the pin includes a male thread portion which is a tapered thread, and a seal portion which includes a tapered surface, and the box includes a female thread portion which is a tapered thread, and a seal portion which includes a tapered surface, and wherein when the male thread portion and the female thread portion are made-up by screwing, a root of the male thread portion and a crest of the female thread portion come into contact with each other after the seal portion of the pin and the seal portion of the box come into contact with each other, in a process of the make-up, and in a state before the make-up, a minimum diameter of the tapered surface of the pin is smaller than a maximum diameter of the tapered surface of the box.

(2) In the aspect according to the above (1), the seal portion of the pin may be provided on each of a tip side of the pin from the male thread portion and a base side of the pin from the male thread portion.

(3) In the aspect according to the above (1) or (2), the pin may further include an R portion which is provided on a tip side of the pin from the seal portion of the pin, and the box may further include an R portion which is provided on a tip side of the box from the seal portion of the box.

(4) In the aspect according to any one of the above (1) to (3), the male thread portion may be divided into a plurality of male thread portions along a pipe axis direction of the first pipe, and the seal portion of the pin may be further provided between the male thread portions adjacent to each other in the pipe axis direction.

(5) In the aspect according to any one of the above (1) to (4), the pin may further include an abutment surface which is provided on a tip or a base of the pin.

(6) In the aspect according to any one of the above (1) to (5), each of the first pipe and the second pipe may be a steel pipe.

(7) In the aspect according to the above (6), an outer diameter of a body of the first pipe may be 190 mm or more, an outer diameter of a body of the second pipe may be 190 mm or more, and in the state before the make-up, an outer diameter of the box may be more than 100% of the outer diameter of the body of the first pipe, and be less than 104% of the outer diameter of the body of the first pipe.

(8) In the aspect according to the above (7), in the state before the make-up, a difference between the minimum diameter of the tapered surface of the pin and the maximum diameter of the tapered surface of the box may be more than 0% of the outer diameter of the body of the first pipe, and be 0.3% or less of the outer diameter of the body of the first pipe.

(9) In the aspect according to any one of the above (1) to (5), the first pipe may be a steel pipe and the second pipe may be a coupling.

(10) In the aspect according to the above (9), an outer diameter of a body of the first pipe may be 190 mm or more.

(11) In the aspect according to the above (10), in the state before the make-up, a difference between the minimum diameter of the tapered surface of the pin and the maximum diameter of the tapered surface of the box may be more than 0% of the outer diameter of the body of the first pipe, and be 0.3% or less of the outer diameter of the body of the first pipe.

Effects of the Invention

According to each of the aspects, it is possible to prevent humping of a make-up torque which is occurred when a pin and a box are made-up.

EMBODIMENTS OF THE INVENTION

Hereinafter, each embodiment of the present invention will be described in detail with reference to the drawings. Moreover, in the present specification and the drawings, the same numeral references are assigned to the same components having substantially the same function and configuration, and overlapped descriptions thereof are omitted.

First Embodiment

Configuration Example of Threaded Connection for Steel Pipe

Figure 1A:
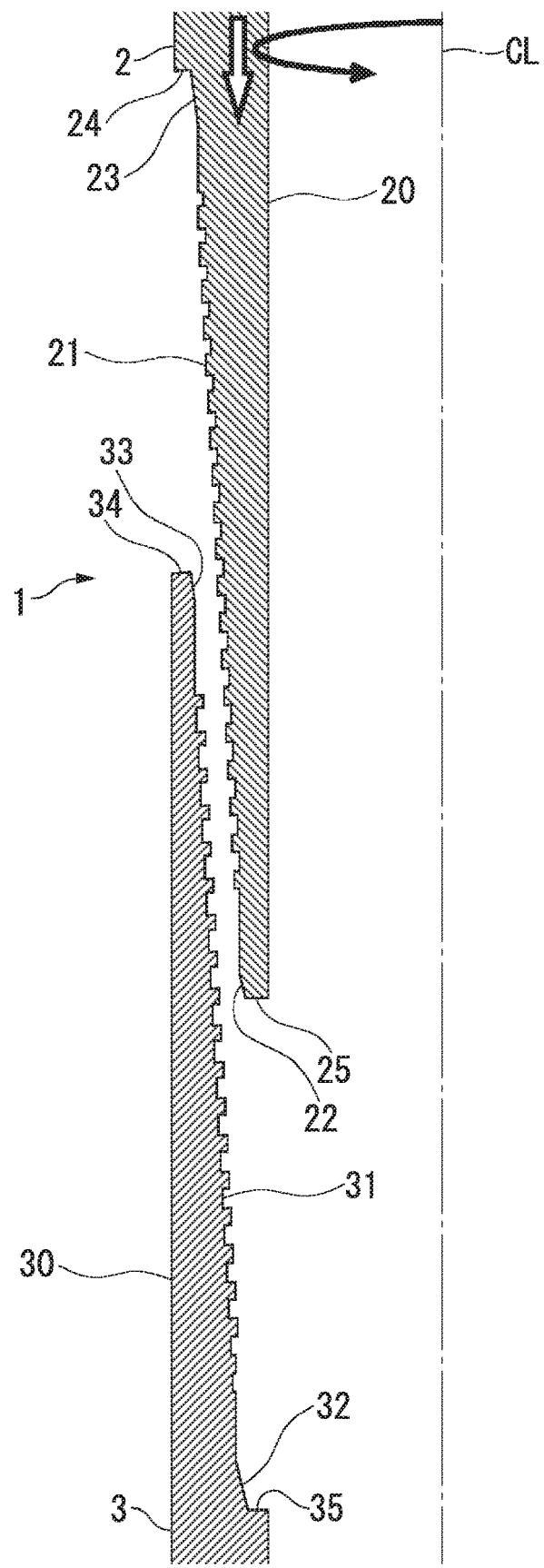
FIG. 1A is a longitudinal sectional view which shows a main portion of a threaded connection for a steel pipe according to a first embodiment of the present invention and shows a state before a pin and a box are made-up.
Figure 1B:
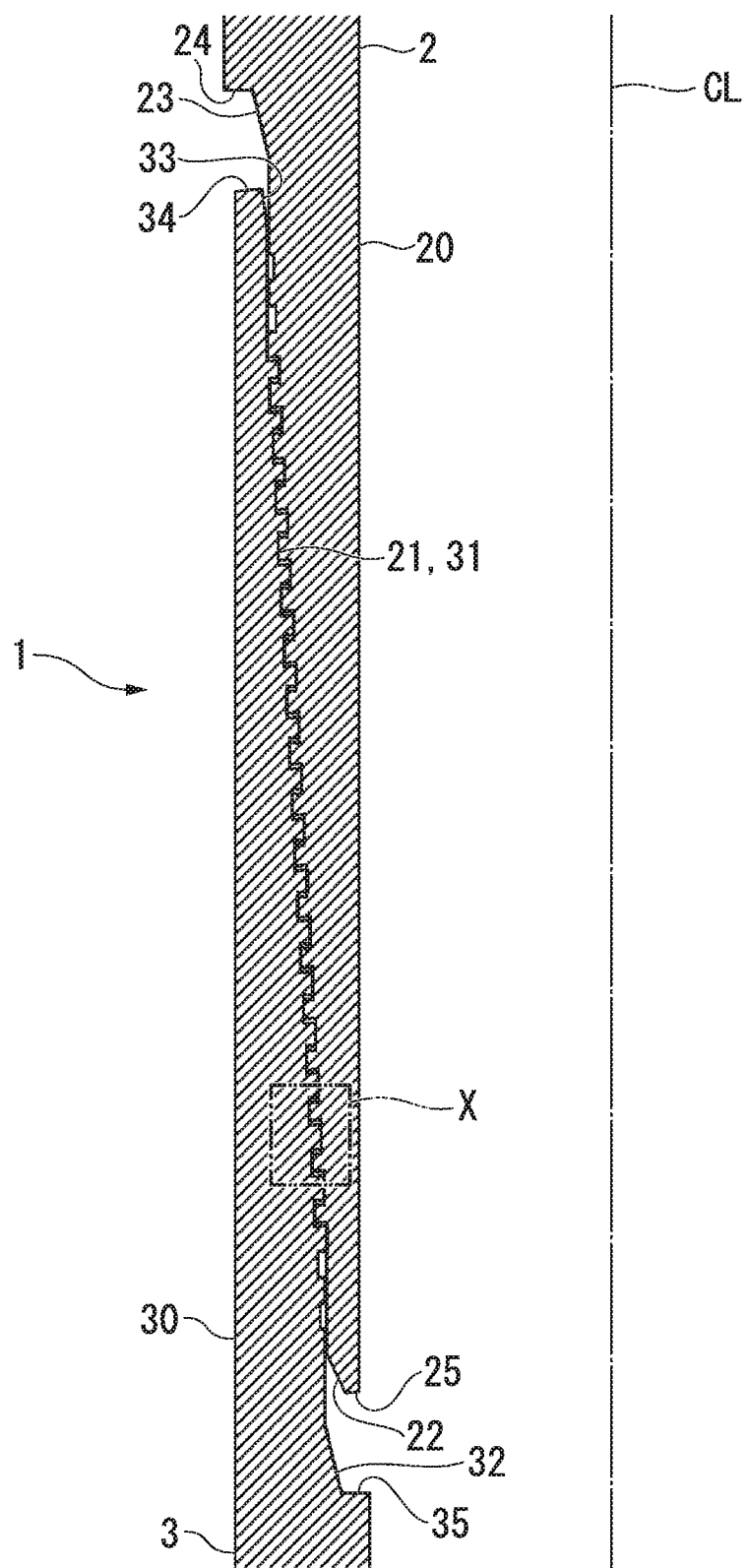
FIG. 1B is a view showing a beginning of the make-up between the pin and the box in the threaded connection for a steel pipe shown in FIG. 1A.
Figure 1C:
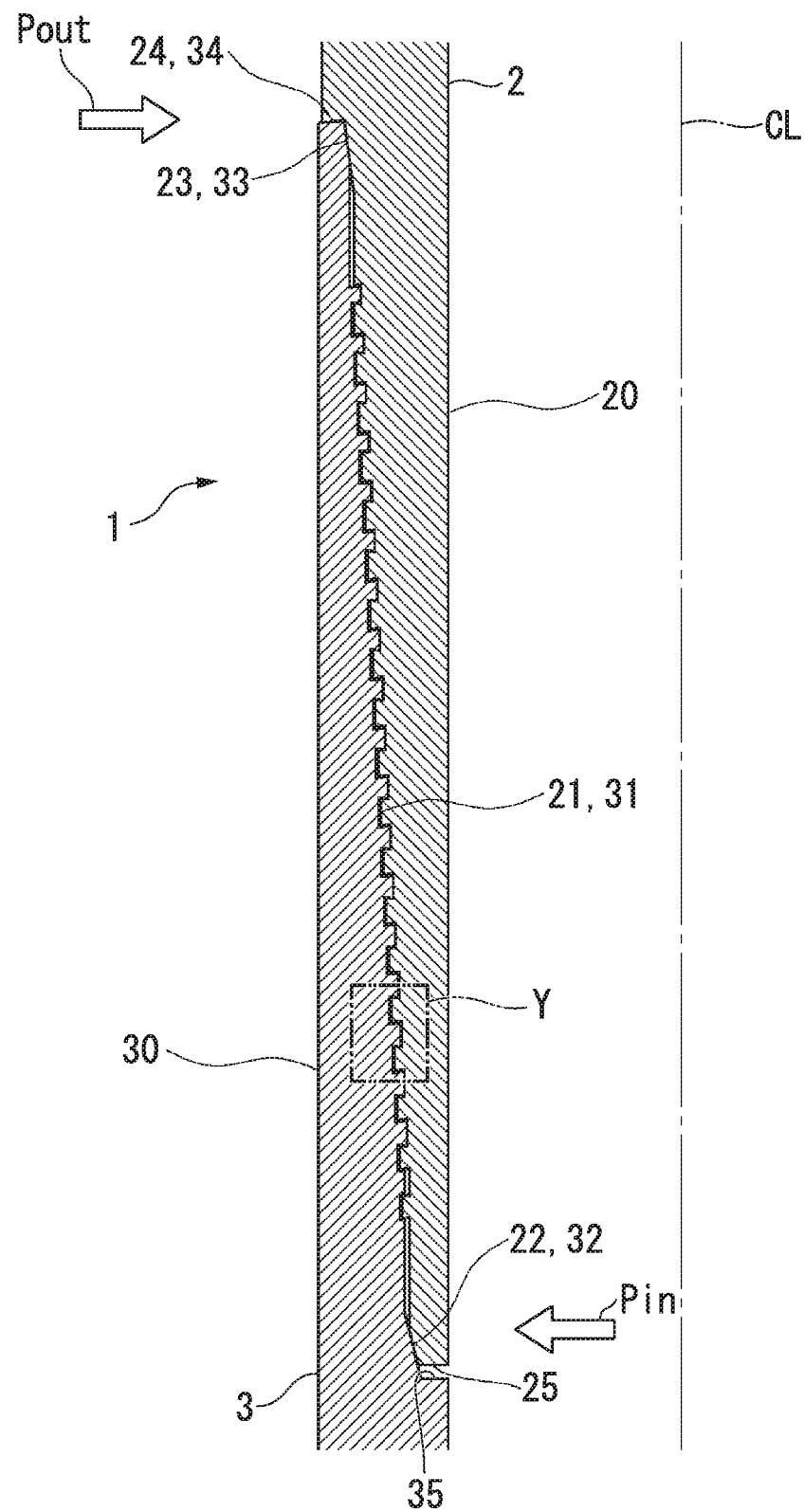
FIG. 1C is a view showing a state when the make-up between the pin and the box is completed in the threaded connection for a steel pipe shown in FIG. 1A.

First, a threaded connection 1 for a steel pipe (hereinafter, also simply referred to as a "threaded connection") according to a first embodiment of the present invention will be described. FIGS. 1A to 1C are longitudinal sectional views showing the threaded connection 1 for a steel pipe according to the first embodiment. Moreover, FIG. 1A is a view showing a state before the pin 20 is screwed into the box 30 (a state before a pin 20 and a box 30 are made-up), FIG. 1B is a view showing a state before the screwing of the pin 20 (a state before the make-up between the pin 20 and the box 30), and FIG. 1C is a view showing a state when the screwing of the pin 20 is completed (a state when the make-up between the pin 20 and the box 30 is completed). The make-up between the pin 20 and the box 30 will be described below.

As shown in FIGS. 1A to 1C, the threaded connection 1 for a steel pipe according to the first embodiment is used to connect (join) an upper pipe 2 (a first pipe) and a lower pipe 3 (a second pipe) in series along a direction of a pipe axis CL (longitudinal direction of a pipe, a connection direction, or a vertical direction: refer to FIG. 1A). The threaded connection 1 for a steel pipe includes a truncated cone shaped pin 20 which is provided on one end (lower end) of the upper pipe 2, and a box 30 which is provided on an opening end (upper end) of the lower pipe 3. In addition, the threaded connection 1 for a steel pipe is an integral type threaded connection in which both the upper pipe 2 and the lower pipe 3 are steel pipes. In addition, hereinafter, the direction of the pipe axis CL is referred to as a "pipe axis direction".

As shown in FIG. 1A, in the truncated cone shaped pin 20 provided on the lower end (one end) of the upper pipe 2, a tip surface 25, a first R portion 26 (a first curved portion), a first seal portion 22, a male thread portion 21, a second R portion 27 (a second curved portion), a second seal portion 23, and an abutment surface 24 are provided in this order from a tip side of the pin 20. Moreover, in FIG. 1A, the first R portion 26 and the second R portion 27 are not shown. The male thread portion 21 is a tapered thread and is spirally formed on an outer circumferential surface of the pin 20. The abutment surface 24 is an annular surface along a radial direction (a direction perpendicular to the pipe axis direction) and is slightly inclined in the radial direction. For example, preferably, an inclination angle of the abutment surface 24 is less than or equal to 20°, and more preferably, is 15°. Here, the tapered thread means a thread which is provided on an outer surface or an inner surface of a truncated cone.

In addition, in FIG. 1A, the lower side is the tip side (front end side) in the pin 20, and the upper side is the tip side (front end side) in the box 30. Moreover, sides opposite to the tip sides of the pin 20 and the box 30 are referred to as base sides (rear end sides). Hereinafter, these are similarly applied to all the drawings in the present specification.

Moreover, as shown in FIG. 1A, in the box 30 provided on the opening end (upper end) of the lower pipe 3, a base surface 35, a third seal portion 32, a third R portion 36 (a third curved portion), a female thread portion 31, a fourth seal portion 33, a fourth R portion 37 (a fourth curved portion), and an abutment surface 34 are provided in this order from a base side of the box 30. Moreover, in FIG. 1A, the third R portion 36 and the fourth R portion 37 are not shown. Similar to the male thread portion 21, the female thread portion 31 is a tapered thread and is spirally formed on an inner circumferential surface of the box 30.

The third seal portion 32, the female thread portion 31, the fourth seal portion 33, and the abutment surface 34 of the box 30 are provided to correspond to the first seal portion 22, the male thread portion 21, the second seal portion 23, and the abutment surface 24 of the pin 20, respectively. Moreover, although it will be described below, thread teeth of the male thread portion 21 of the pin 20 and thread teeth of the female thread portion 31 of the box 30 have an inverted trapezoid shape (hereinafter, referred to as a dovetail shape) when viewed from a cross section parallel to the pipe axis direction, and mesh with each other.

Figure 2A:
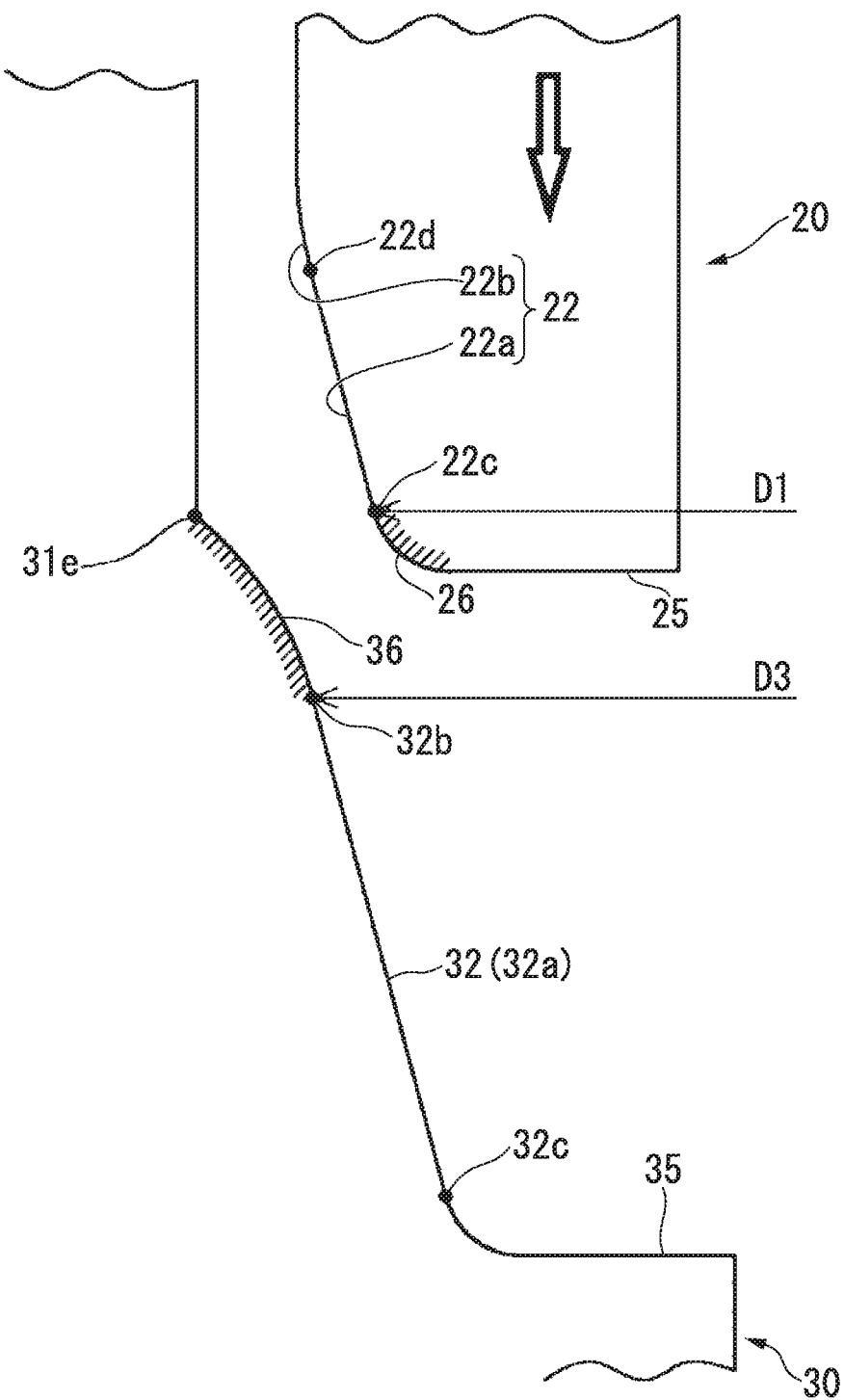
FIG. 2A is an enlarged view of FIG. 1B which shows a tip side of the pin.

FIG. 2A is an enlarged view of FIG. 1B, and shows the tip side of the pin 20 (the base side of the box 30). As shown in FIG. 2A, the first seal portion 22 includes a first tapered surface 22a (a first seal tapered surface) and a first curvature surface 22b which are formed on the outer circumferential surface of the pin 20.

When the pin 20 is viewed from the cross section parallel to the pipe axis direction, the first tapered surface 22a is inclined at a predetermined angle (taper angle). That is, the first tapered surface 22a forms a truncated cone surface in which the diameter is gradually decreased from the base side of the pin 20 toward the tip side on the outer circumferential surface of the pin 20. For example, preferably, the taper angle of the tapered surface 22a is 2° to 21°, more preferably, is 2° to 15°, and most preferably, is 2° to 7°.

When the pin 20 is viewed from the cross section parallel to the pipe axis direction, the first curvature surface 22b is formed in a curve which is drawn at a predetermined curvature such as an arc, and smoothly connects the first seal portion 22 (first tapered surface 22a) and the male thread portion 21. In this way, the first curvature surface 22b is provided, the first seal portion 22 (first tapered surface 22a) and the male thread portion 21 are smoothly connected to each other, and thus, it is possible to prevent galling at the time of the make-up. In addition, the first curvature surface 22b may include an arc and may include a curve other than an arc.

The first R portion 26 (a front R portion of the pin 20) of the pin 20 has a slight and small round shape (refer to an oblique line portion of FIG. 2A), and smoothly connects the first seal portion 22 and the tip surface 25. That is, the first R portion 26 (first curved portion) includes a surface (curvature surface or R surface) corresponding to a circumferential surface of a rotating body which is obtained by rotating a curve drawn at a predetermined curvature such as an arc around the pipe axis CL. In this way, the first R portion 26 is provided and smoothly connects the first seal portion 22 and the tip surface 25, and thus, it is possible to prevent galling at the time of the make-up. Moreover, the first R portion 26 may include an arc and may include a curve other than an arc.

In addition, as shown in FIG. 2A, the third seal portion 32 of the box 30 includes a third tapered surface 32a (a third seal tapered surface). When the box 30 is viewed from the cross section parallel to the pipe axis direction, the third tapered surface 32a is inclined at a predetermined angle (taper angle). That is, the third tapered surface 32a forms a truncated cone surface in which the diameter is gradually increased from the base side of the box 30 toward the tip side on the inner circumferential surface of the box 30. For example, preferably, the taper angle of the third tapered surface 32a is 2° to 21°, more preferably, is 2° to 15°, and most preferably, is 2° to 7°.

The third R portion 36 (a rear R portion of the box 30) of the box 30 has a slight and large round shape (refer to an oblique line portion of FIG. 2A), and smoothly connects the third seal portion 32 and a rear end 31e of the female thread portion 31 (not shown in FIG. 2A). That is, the third R portion 36 (third curved portion) includes a surface (curvature surface or R surface) corresponding to a circumferential surface of a rotating body which is obtained by rotating a curve drawn at a predetermined curvature such as an arc around the pipe axis CL. In this way, the third R portion 36 is provided and smoothly connects the third seal portion 32 and the rear end 31e of the female thread portion 31, and thus, it is possible to prevent galling at the time of the make-up. Moreover, the third R portion 36 may include an arc and may include a curve other than an arc.

The taper angle of the first tapered surface 22a of the pin 20, and the taper angle of the third tapered surface 32a of the box 30 are constant. In addition, the taper angle of the first tapered surface 22a is substantially the same as the taper angle of the third tapered surface 32a. Here, the taper angles being substantially the same as each other means that a difference of ±0.75° is allowed.

Moreover, the third tapered surface 32a is longer than the first tapered surface 22a. That is, a distance between a front end 32b and a rear end 32c in the third tapered surface 32a is longer than a distance between a front end 22c and a rear end 22d in the first tapered surface 22a.

In addition, as shown in FIG. 2A, the first seal portion 22, the third seal portion 32, the first R portion 26, and the third R portion 36 are threadless portions.

Moreover, preferably, the third seal portion 32 is configured of only the third tapered surface 32a. In this case, since the tapered surfaces come into contact with each other with a wider surface area, an average contact pressure can be suppressed. As a result, galling resistance performance can be improved.

Figure 2B:
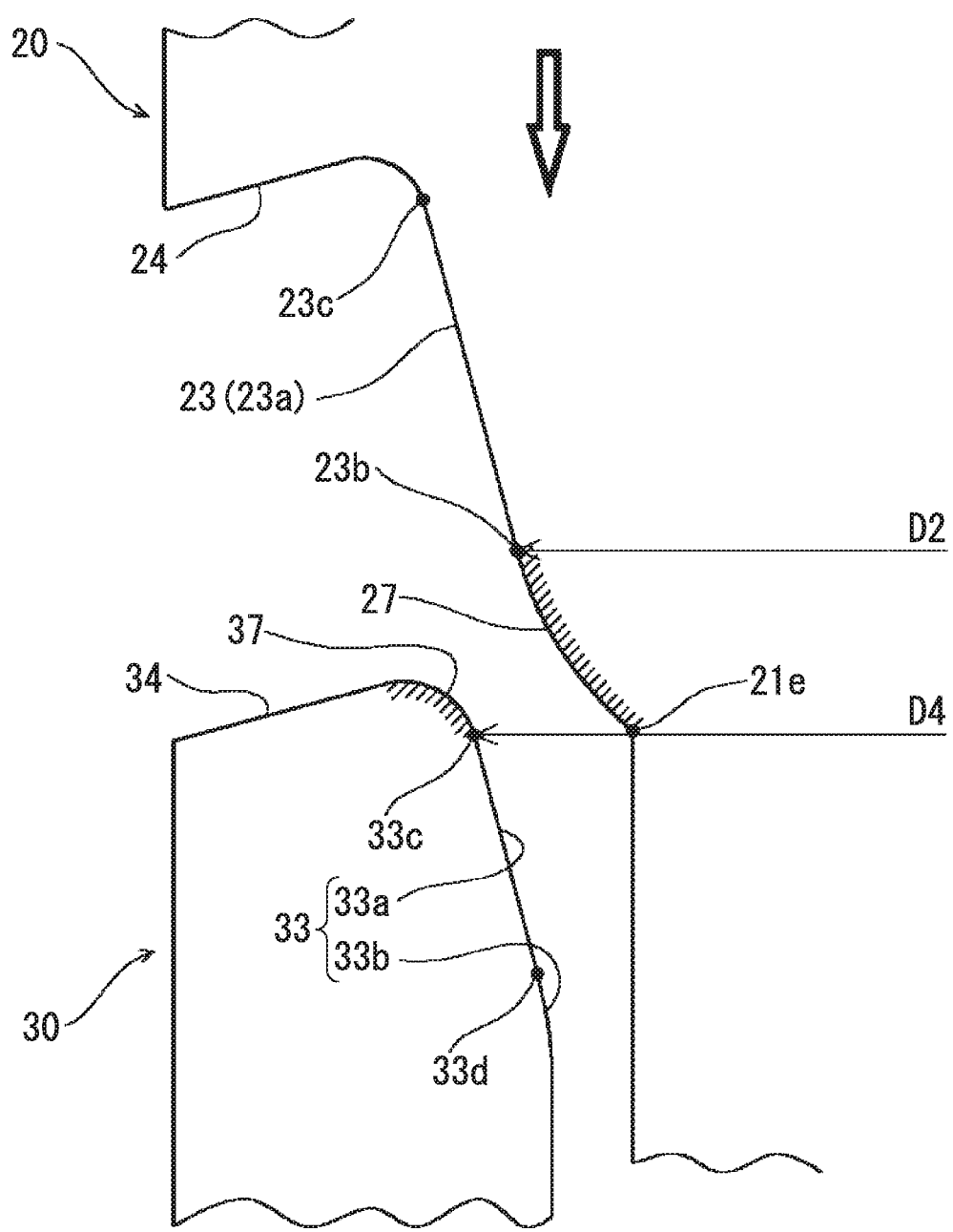
FIG. 2B is an enlarged view of FIG. 1B which shows a base side of the pin.

FIG. 2B is an enlarged view of FIG. 1B, and shows the base side of the pin 20 (the tip side of the box 30). As shown in FIG. 2B, the second seal portion 23 of the pin 20 includes a second tapered surface 23a (a second seal tapered surface) formed on the outer circumferential surface of the pin 20.

When the pin 20 is viewed from the cross section parallel to the pipe axis direction, the second tapered surface 23a is inclined at a predetermined angle (taper angle). That is, the second tapered surface 23a forms a truncated cone surface in which the diameter is gradually decreased from the base side of the pin 20 toward the tip side on the outer circumferential surface of the pin 20. For example, preferably, the taper angle of the second tapered surface 23a is 2° to 21°, more preferably, is 2° to 15°, and most preferably, is 2° to 7°.

The second R portion 27 (a rear R portion of the pin 20) of the pin 20 has a slight and large round shape (refer to an oblique line portion of FIG. 2B), and smoothly connects the second seal portion 23 and the rear end 21e of the male thread portion 21 (not shown in FIG. 2B). That is, the second R portion 27 (second curved portion) includes a surface (curvature surface or R surface) corresponding to a circumferential surface of a rotating body which is obtained by rotating a curve drawn at a predetermined curvature such as an arc around the pipe axis. In this way, the second R portion 27 is provided and smoothly connects the second seal portion 23 and the rear end 21e of the male thread portion 21, and thus, it is possible to prevent galling at the time of the make-up. Moreover, the second R portion 27 may include an arc and may include a curve other than an arc.

The fourth seal portion 33 of the box 30 includes a fourth tapered surface 33a (fourth seal tapered surface) and a second curvature surface 33b which are formed on the inner circumferential surface of the box 30.

When the box 30 is viewed from the cross section parallel to the pipe axis direction, the fourth tapered surface 33a is inclined at a predetermined angle (taper angle). That is, the fourth tapered surface 33a forms a truncated cone surface in which the diameter is gradually increased from the base side of the box 30 toward the tip side on the inner circumferential surface of the box 30. For example, preferably, the taper angle of the fourth tapered surface 33a is 2° to 21°, more preferably, is 2° to 15°, and most preferably, is 2° to 7°.

When the box 30 is viewed from the cross section parallel to the pipe axis direction, the second curvature surface 33b forms a curve which is drawn at a predetermined curvature such as an arc and smoothly connects the fourth seal portion 33 (fourth tapered surface 33a) and the female thread portion 31 (not shown in FIG. 2B). In this way, the second curvature surface 33b is provided and smoothly connects the fourth seal portion 33 (fourth tapered surface 33a) and the female thread portion 31, and thus, it is possible to prevent galling at the time of the make-up. Moreover, the second curvature 33b may include an arc and may include a curve other than an arc.

The fourth R portion 37 of the box 30 (front R portion of the box 30) has a slight and small round shape (refer to an oblique line portion of FIG. 2B), and smoothly connects the fourth seal portion 33 and the abutment surface 34 of the box 30. That is, the fourth R portion 37 (fourth curved portion) includes a surface (curvature surface or R surface) corresponding to a circumferential surface of a rotating body which is obtained by rotating a curve drawn at a predetermined curvature such as an arc around the pipe axis CL. In this way, the fourth R portion 37 is provided, and the fourth seal portion 33 and the abutment surface 34 of the box 30 are smoothly connected to each other, and thus, it is possible to prevent galling at the time of the make-up. Moreover, the fourth R portion 37 may include an arc and may include a curve other than an arc.

The taper angle of the second tapered surface 23a of the pin 20, and the taper angle of the fourth tapered surface 33a of the box 30 are constant. In addition, the taper angle of the second tapered surface 23a is substantially the same as the taper angle of the fourth tapered surface 33a. Here, the taper angles being substantially the same as each other means that a difference of ±0.75° is allowed.

Moreover, the second tapered surface 23a is longer than the fourth tapered surface 33a. That is, a distance between a front end 33c and a rear end 33d in the fourth tapered surface 33a is shorter than a distance between a front end 23b and a rear end 23c in the second tapered surface 23a.

In addition, as shown in FIG. 2B, the second seal portion 23, the fourth seal portion 33, the second R portion 27, and the fourth R portion 37 are threadless portions.

Moreover, preferably, the second seal portion 23 of the pin 20 is configured of only the second tapered surface 23a. In this case, since the tapered surfaces come into contact with each other with a wider surface area, an average contact pressure can be suppressed. As a result, galling resistance performance can be improved.

Figure 3A:
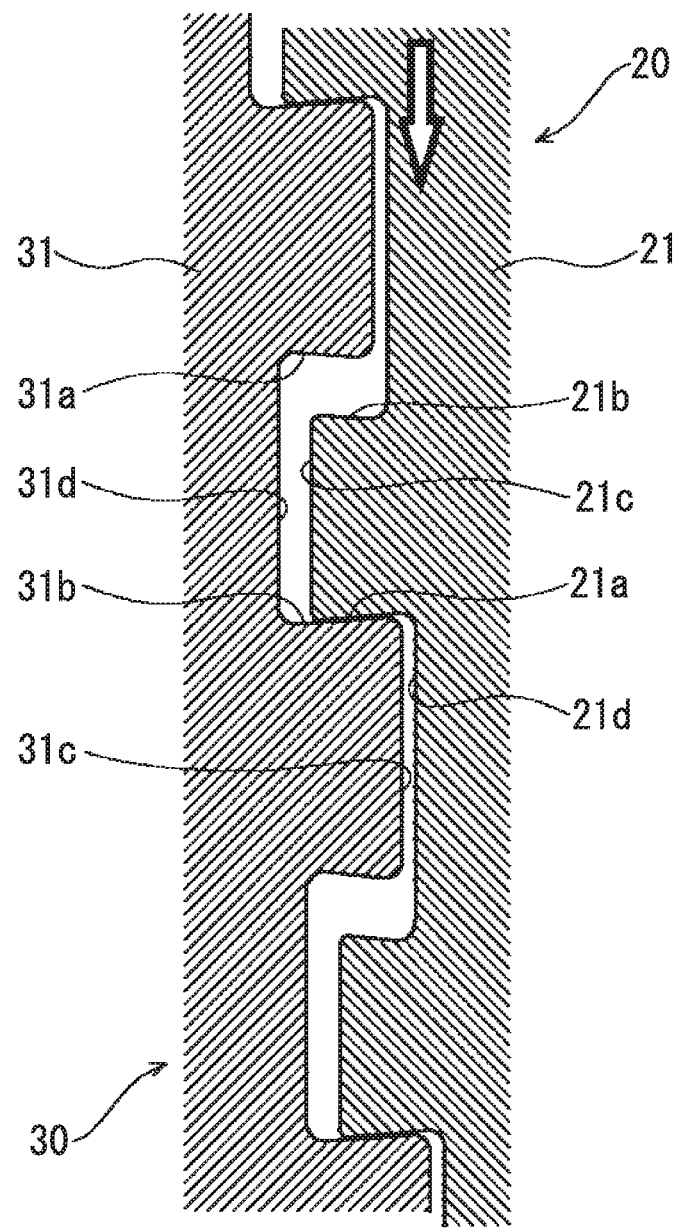
FIG. 3A is an enlarged view which shows a portion indicated by X in FIG. 1B and shows a male thread portion and a female thread portion.

FIG. 3A is an enlarged view which shows a portion indicated by X in FIG. 1B, and shows the male thread portion 21 and the female thread portion 31. As shown in FIG. 3A, the male thread portion 21 includes a crest 21c, a root 21d, a stabbing flank surface 21a, and a load flank surface 21b. Since the pin 20 has a tapered shape, diameters of the crest 21c and the root 21d are changed along the pipe axis direction. The crest 21c and the root 21d are parallel to the pipe axis direction. A connection curved portion is provided in each of the crest 21c and the root 21d.

In addition, the male thread portion 21 has a dovetail shape in which a width (a length of the crest 21c in the pipe axis direction) of the crest 21c is wider than a width of a base portion (a root portion of a thread tooth).

In addition, as shown in FIG. 3A, the female thread portion 31 includes a crest 31c, a root 31d, a stabbing flank surface 31b, and a load flank surface 31a. Since the box 30 has a tapered shape, diameters of the crest 31c and the root 31d are changed along the pipe axis direction. The crest 31c and the root 31d are parallel to the pipe axis direction. A connection curved portion is provided in each of the crest 31c and the root 31d.

In addition, similar to the male thread portion 21, the female thread portion 31 also has a dovetail shape (inverted trapezoid shape).

The crests 21c and 31c, and the roots 21d and 31d have widths which are changed along the pipe axis direction. For example, a width L of the crest 21c is represented as follows.

$$L = L_0 + Ax \qquad \text{(Equation 1)}$$

Here, $L_0$ and $A$ are constants, $x$ is a position along the pipe axis direction, and the width L is measured to be parallel to the pipe axis direction.

In the threaded connection 1 for a steel pipe, the width of the crest 21c of the male thread portion 21 is decreased along the pipe axis direction (that is, the width of the crest is decreased from the base side of the pin 20 toward the tip side), and the width of the root 21d of the male thread portion 21 is increased along the pipe axis direction (that is, the width of the root is increased from the base side of the pin 20 toward the tip side). Moreover, the width of the crest 31c of the female thread portion 31 is increased along the pipe axis direction (that is, the width of the crest is increased from the tip side of the box 30 toward the base side), and the width of the root 31d of the female thread portion 31 is decreased along the pipe axis direction (that is, the width of the root is decreased from the tip side of the box 30 toward the base side).

Next, a process of screwing the pin 20 into the box 30 (a process of a make-up between the pin 20 and the box 30) will be described.

When the upper pipe 2 and the lower pipe 3 are connected to each other (when the pin 20 and the box 30 are made-up), first, as shown in FIG. 1A, the pin 20 is inserted into the box 30 along the pipe axis direction. Next, the pin 20 is relatively rotated with respect to the box 30 around the pipe axis CL. In this way, the pin 20 is screwed into the box 30 along the pipe axis direction, and the screwing of the pin 20 (the make-up between the pin 20 and the box 30) progresses. That is, the screwing of the pin 20 to the box 30 progresses from the base side of the pin 20 toward the tip side (a progression direction of the screwing).

As shown in FIG. 3A, in a state when the make-up between the pin 20 and the box 30 begins, the stabbing flank surface 21a of the male thread portion 21 comes into contact with the stabbing flank surface 31b of the female thread portion 31 by the entire weight of the upper pipe 2. In other words, in the state when the make-up begins, except for the stabbing flank surfaces 21a and 31b, the male thread portion 21 and the female thread portion 31 do not come into contact with each other.

If the pin 20 is further screwed into the box 30 along the pipe axis direction from the state when the make-up begins, which is shown in FIGS. 1B and 3A, the first seal portion 22 and the second seal portion 23 of the pin 20 come into close contact with the third seal portion 32 and the fourth seal portion 33 of the box 30, respectively. If the pin 20 is further screwed into the box 30 from this state, the root 21d of the male thread portion 21 and the crest 31c of the female thread portion 31 come into contact with each other.

Moreover, if the pin 20 is further screwed into the box 30, as shown in FIG. 1C, the abutment surface 24 of the pin 20 and the abutment surface 34 of the box 30 abut into contact with each other, the abutment surface 24 of the pin 20 is pressed to the abutment surface 34 of the box 30, and the screwing of the pin 20 (the make-up between the pin 20 and the box 30) is completed. In this way, the abutment surfaces 24 and 34 abut into contact with each other, the screwing of the pin 20 is limited, and a load in a direction opposite to the progression direction of the screwing, that is, a make-up axial force of a thread is applied to the male thread portion 21 of the pin 20.

In addition, as shown in FIG. 1C, since the first seal portion 22 and the third seal portion 32 interfere with each other in the radial direction while coming into contact with each other, a structure (metal touch seal) in which at least a part of the first seal portion 22 comes into close contact with at least a part of the third seal portion 32 over the entire circumference is obtained. The sealing by the first seal portion 22 and the third seal portion 32 takes a role of mainly sealing an inner pressure Pin of the upper pipe 2 and the lower pipe 3.

Similarly, since the second seal portion 23 and the fourth seal portion 33 interfere with each other in the radial direction while coming into contact with each other, a structure (metal touch seal) in which at least a part of the second seal portion 23 comes into close contact with at least a part of the fourth seal portion 33 over the entire circumference is obtained. The sealing by the second seal portion 23 and the fourth seal portion 33 takes a role of mainly sealing an outer pressure Pout of the upper pipe 2 and the lower pipe 3.

Figure 3B:
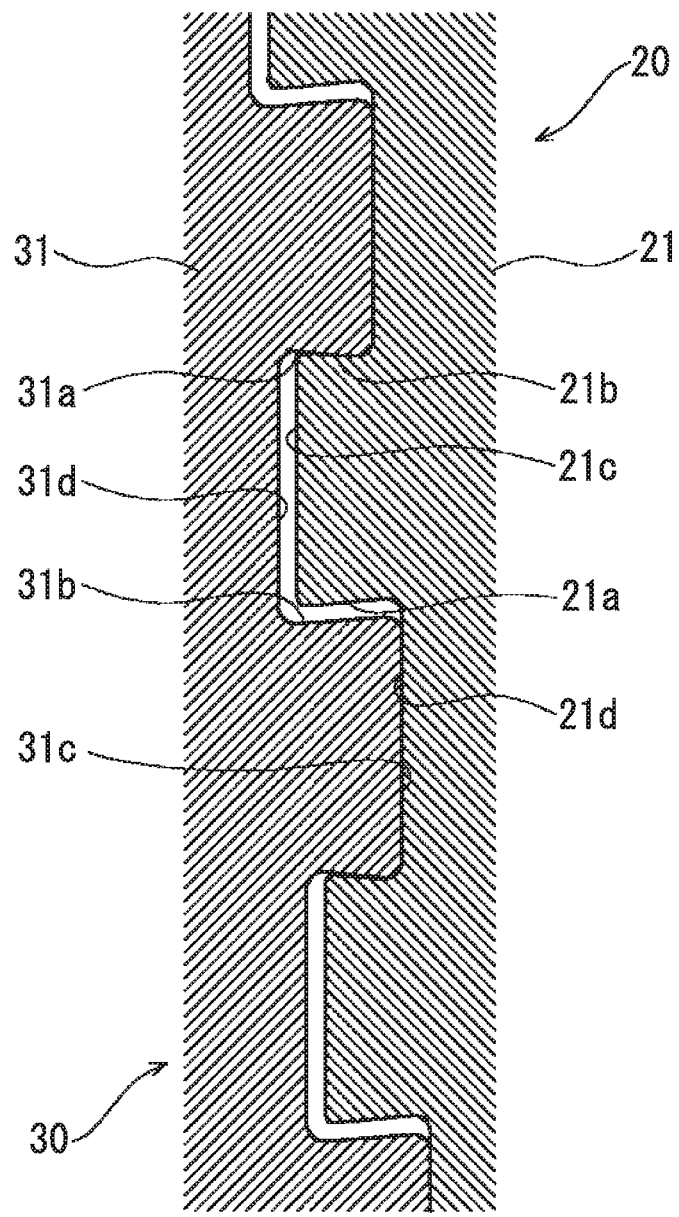
FIG. 3B is an enlarged view which shows a portion indicated by Y in FIG. 1C and shows the male thread portion and the female thread portion.

FIG. 3B is an enlarged view which shows a portion indicated by Y in FIG. 1C, and shows the male thread portion and the female thread portion in a state when the make-up is completed. As shown in FIG. 3B, in the state when the make-up is completed, the load flank surface 21b of the male thread portion 21 and the load flank surface 31a of the female thread portion 31 opposing the load flank surface 21b come into close contact with each other, and thus, the root 21d of the male thread portion 21 and the crest 31c of the female thread portion 31 come into close contact with each other. Moreover, as shown in FIG. 3B, in the state when the make-up is completed, there is a gap between the stabbing flank surface 21a of the pin 20 and the stabbing flank surface 31b of the box 30 in the pipe axis direction, and there is a gap between the crest 21c of the pin 20 and the root 31d of the box 30 in the radial direction.

As described above, the pin 20 is screwed into the box 30, the make-up between the pin 20 and the box 30 is completed, and thus, the upper pipe 2 and the lower pipe 3 are connected to each other.

[Cause of Humping]

Figure 9A:
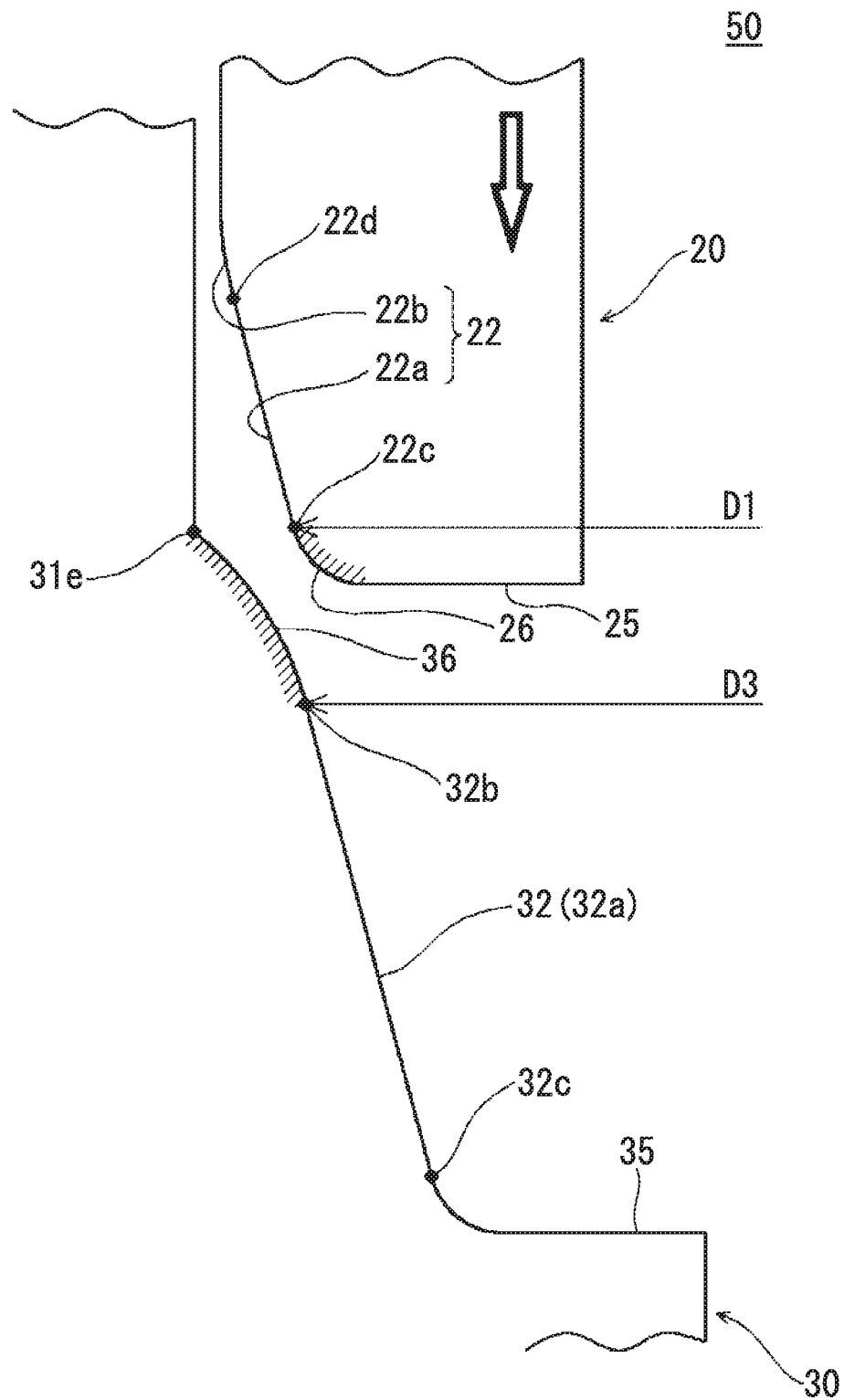
FIG. 9A is an enlarged view which shows the threaded connection for a steel pipe at which humping of the make-up torque is occurred and shows the tip side of the pin.
Figure 9B:
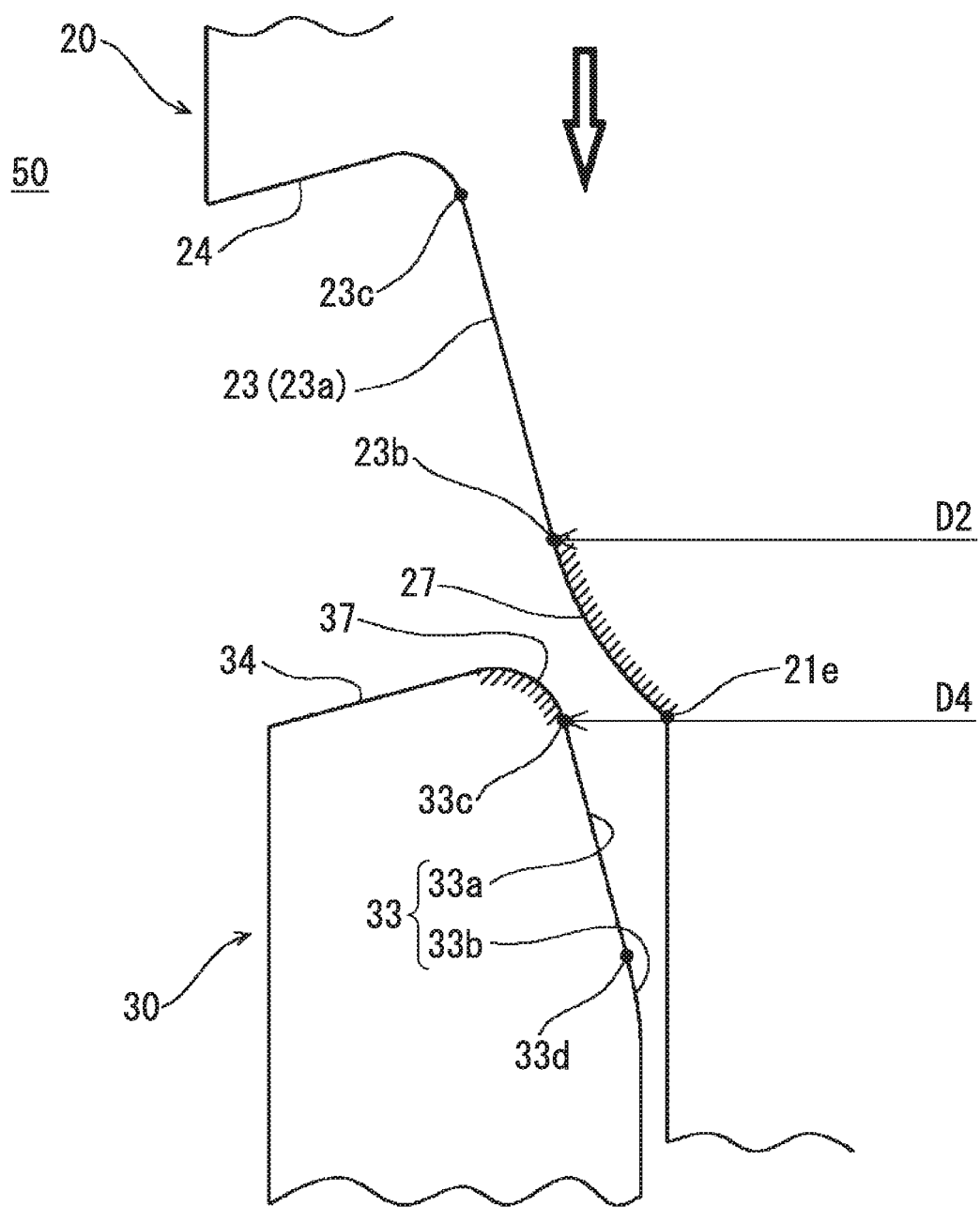
FIG. 9B is an enlarged view which shows the threaded connection for a steel pipe in which the humping of the make-up torque is occurred and shows the base side of the pin.

Next, a cause in which the humping of the make-up torque occurs will be described. FIGS. 9A and 9B are enlarged views showing a threaded connection 50 for a steel pipe in which the humping occurs. In addition, FIG. 9A shows the tip side of the pin and FIG. 9B shows the base side of the pin 20.

As described above, in the state when the make-up between the pin 20 and the box 30 begins, the stabbing flank surface 21a of the male thread portion 21 and the stabbing flank surface 31b of the female thread portion 31 come into contact with each other. However, except for the stabbing flank surfaces, the male thread portion 21 and the female thread portion 31 do not come into contact with each other (refer to FIG. 3A). That is, in the state when the make-up begins, a gap exists between the root 21d of the male thread portion 21 and the crest 31c of the female thread portion 31. In addition, gaps also exist between the crest 21c of the male thread portion 21 and the root 31d of the female thread portion 31, and between the load flank surface 21b of the male thread portion 21 and the load flank surface 31a of the female thread portion 31.

That is, in the state when the make-up between the pin 20 and the 30 begins, since the male thread portion 21 of the pin 20 and the female thread portion 31 of the box 30 slightly mesh with each other, there is feasibility in the engagement of the threads. Accordingly, in the process in which the screwing progresses, the pipe axis (center) of the upper pipe 2 and the pipe axis (center) of the lower pipe 3 may be mis-aligned with each other.

Under these circumstances, in a state before the pin 20 and the box 30 are made-up, when the pin 20 and the box 30 are in the following (i) and (ii), it is determined that humping occurs although abnormality such as galling does not occur.

(i) A diameter D1 of the front end 22c in the first tapered surface 22a of the pin 20 is larger than a diameter D3 of the front end 32b in the third tapered surface 32a of the box 30 (refer to FIG. 9A). That is, the minimum diameter D1 of the first tapered surface 22a is larger than the maximum diameter D3 of the third tapered surface 32a.

(ii) A diameter D2 of the front end 23b in the second tapered surface 23a of the pin 20 is larger than a diameter D4 of the front end 33c in the fourth tapered surface 33a of the box 30 (refer to FIG. 9B). That is, the minimum diameter D2 of the second tapered surface 23a is larger than the maximum diameter D4 of the fourth tapered surface 33a of the box 30.

Here, the diameter of the tapered surface is a diameter when the truncated cone shaped seal portion configured of the tapered surface is viewed from the cross section perpendicular to the pipe axis direction.

In the cases of (i) and (ii), if the make-up between the pin 20 and the box 30 progresses, the humping of the make-up torque occurs due to the following phenomenon.

If the pin 20 is screwed into the box 30 from the state shown in FIG. 9A, the first R portion 26 of the pin 20 comes into contact with the third R portion 36 of the box 30 before the first seal portion 22 of the pin 20 comes into contact with the third seal portion 32 of the box 30. When the first R portion 26 and the third R portion 36 come into contact with each other, the first seal portion 22 is not smoothly inserted into the third seal portion 32 by the shapes and the dimensions of the curvature surfaces (R surfaces), and thus, the pipe axis of the upper pipe 2 and the pipe axis of the lower pipe 3 are easily mis-aligned with each other.

Similarly, as shown in FIG. 9B, the second R portion 27 of the pin 20 comes into contact with the fourth R portion 37 of the box 30 before the second seal portion 23 of the pin 20 comes into contact with the fourth seal portion 33 of the box 30. In this way, when the second R portion 27 and the fourth R portion 37 come into contact with each other, the second seal portion 23 is not smoothly inserted into the fourth seal portion 33 by the shapes and the dimensions of the curvature surfaces (R surfaces), and thus, the pipe axis of the upper pipe 2 and the pipe axis of the lower pipe 3 are easily mis-aligned with each other.

As described above, in the state where the first R portion 26 of the pin 20 comes into contact with the third R portion 36 of the box 30, the pin 20 is screwed into the box 30 while the first R portion 26 of the pin 20 unstably comes into contact with the third R portion 36 of the box 30. Similarly, in the state where the second R portion 27 of the pin 20 comes into contact with the fourth R portion 37 of the box 30, the pin 20 is screwed into the box 30 while the second R portion 27 of the pin 20 unstably comes into contact with the fourth R portion 37 of the box 30. As described above, since there is feasibility in the engagement of the threads, which is between the male thread portion 21 of the pin 20 and the female thread portion 31 of the box 30, the unstable screwing generates a temporary increase and irregular variation of the make-up torque. In this way, the humping of the make-up torque occurs even when the galling does not occur.

In order to prevent the above-described humping, in the threaded connection 1 for a steel pipe according to the first embodiment, as shown in FIG. 2A, in the state before the pin 20 and the box 30 are made-up, the diameter D1 of the front end 22c in the first tapered surface 22a is smaller than the diameter D3 of the front end 32b in the third tapered surface 32a.

Similarly, in the threaded connection 1 for a steel pipe according to the first embodiment, as shown in FIG. 2B, in the state before the pin 20 and the box 30 are made-up, the diameter D2 of the front end 23b in the second tapered surface 23a is smaller than the diameter D4 of the front end 33c in the fourth tapered surface 33a.

That is, in the threaded connection 1 for a steel pipe according to the first embodiment, in the state before the pin 20 and the box 30 are made-up, a first condition (D1<D3) in which the minimum diameter D1 of the first tapered surface 22a is smaller than the maximum diameter D3 of the third tapered surface 32a, and a second condition (D2<D4) in which the minimum diameter D2 of the second tapered surface 23a is smaller than the maximum diameter D4 of the fourth tapered surface 33a of the box 30 are satisfied.

Figure 4A:
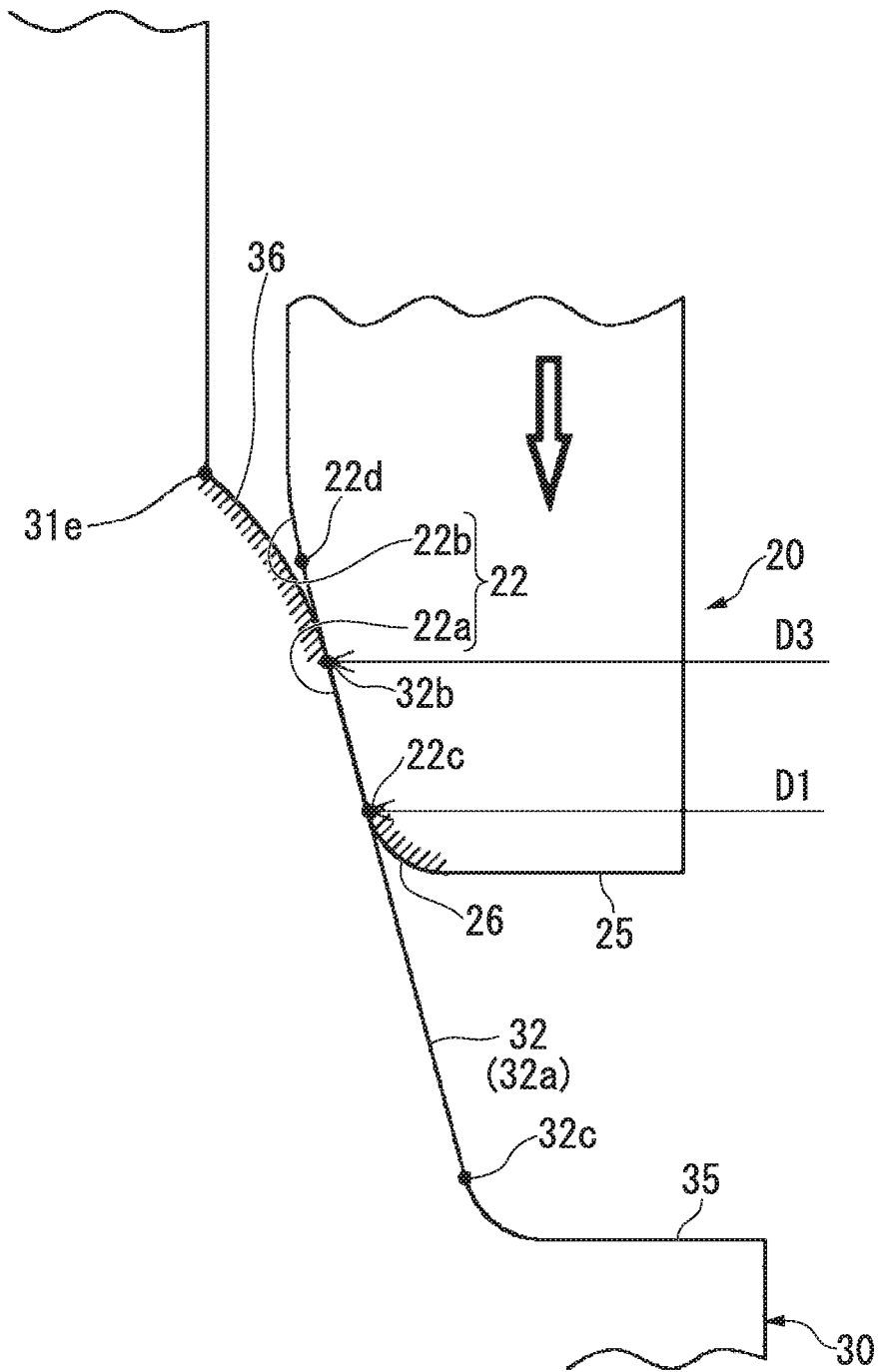
FIG. 4A is a view which shows a state during the make-up between the pin and the box in the threaded connection for a steel pipe shown in FIG. 1A and shows the tip side of the pin.

FIG. 4A is an enlarged view which shows the state in the process of the make-up between the pin 20 and the box 30, and shows the tip side of the pin 20. Moreover, the state in the process of the make-up means that the state where the pin 20 is further screwed into the box 30 from the state when the make-up begins, which is shown in FIG. 2A. In the threaded connection 1 for a steel pipe, as described above, in the state before the pin 20 and the box 30 are made-up, the pin 20 and the box 30 satisfy the relationship of the first condition (D1<D3). Accordingly, as shown in FIG. 4A, the first R portion 26 of the pin 20 does not come into contact with the third R portion 36 of the box 30, and the first tapered surface 22a and the third tapered surface 32a smoothly come into contact with each other.

Figure 4B:
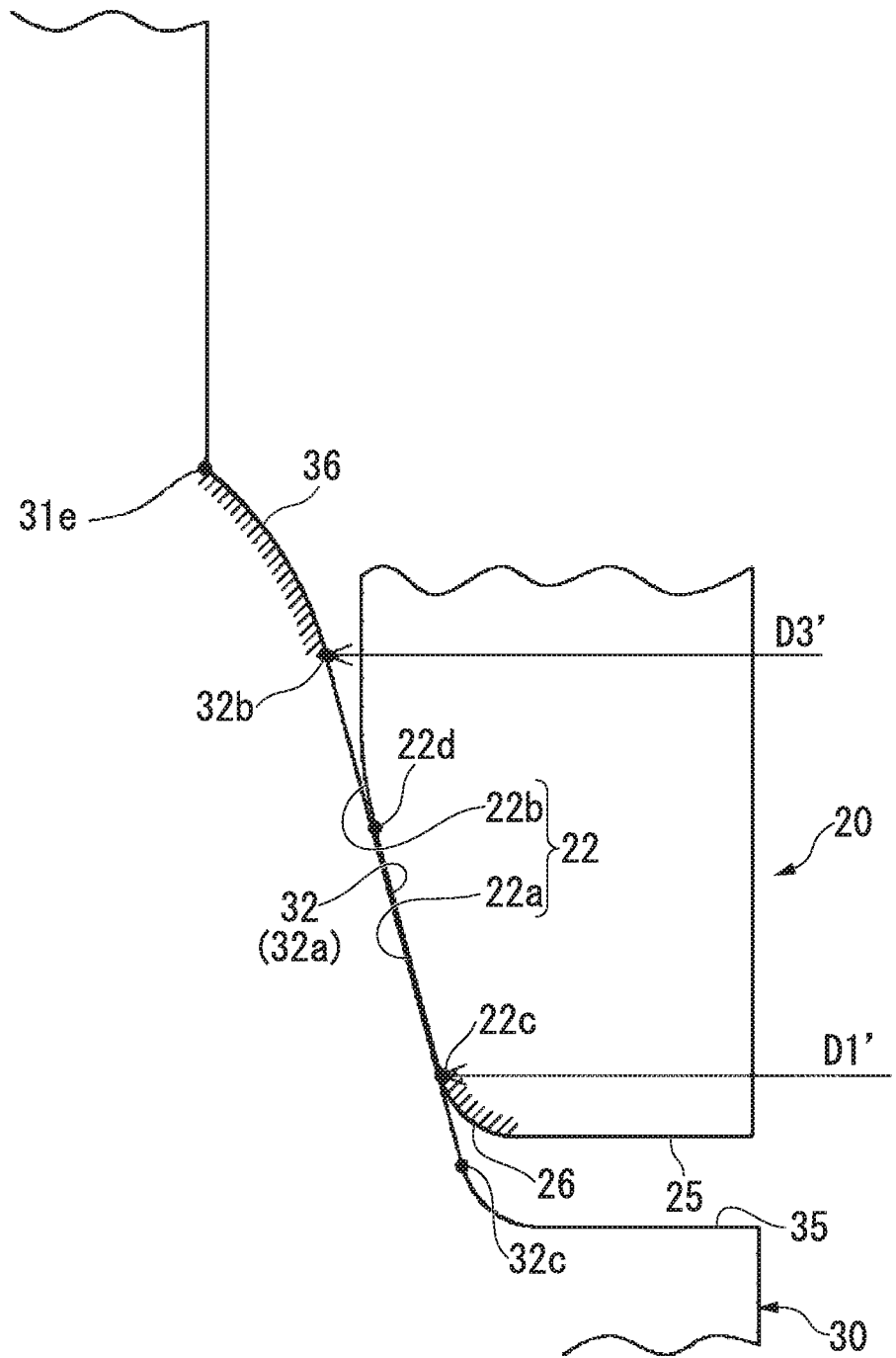
FIG. 4B is an enlarged view of FIG. 1C, and shows the tip side of the pin.

FIG. 4B is an enlarged view which shows the state when the make-up between the pin 20 and the box 30 is completed, and shows the tip side of the pin 20. As described below, in the threaded connection 1 for a steel pipe, the abutment surface 24 of the pin 20 and the abutment surface 34 of the box 30 abut into contact with each other, and thus, the make-up between the pin 20 and the box 30 is completed (refer to FIG. 5B). As shown in FIG. 4B, in the state when the make-up between the pin 20 and the box 30 is completed, a part or whole of the first seal portion 22 comes into close contact with the third tapered surface 32a over the entire circumference. At this time, there is a gap between the tip surface 25 of the pin 20 and the base surface 35 of the box 30.

Moreover, in the state when the make-up is completed, since the first seal portion 22 and the third seal portion 32 interfere with each other in the radial direction, the diameters D1 and D3 in the state before the make-up do not necessarily coincide with diameters D1' and D3' in the state when the make-up is completed.

Moreover, in FIG. 4B, the first tapered surface 22a and the third tapered surface 32a come into contact with each other. However, at least one of the first curvature surface 22b and the first tapered surface 22a may come into contact with the third tapered surface 32a.

Figure 5A:
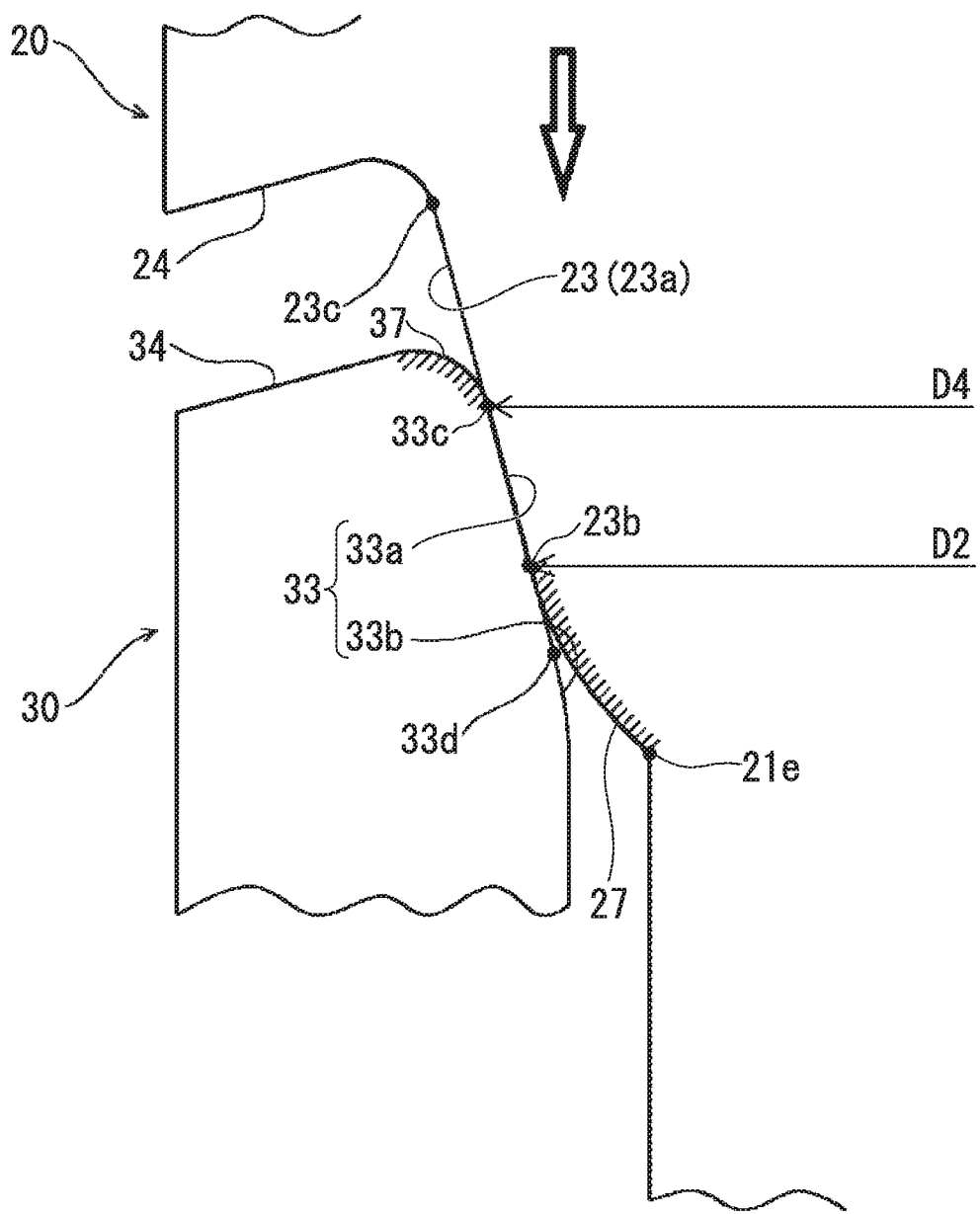
FIG. 5A is a view which shows the state during the make-up between the pin and the box in the threaded connection for a steel pipe shown in FIG. 1A and shows the base side of the pin.

FIG. 5A is an enlarged view which shows the state in the process of the make-up between the pin 20 and the box 30, and shows the base side of the pin 20. Moreover, FIG. 5A corresponds to FIG. 4A. As described above, in the state before the pin 20 and the box 30 are made-up, the pin 20 and the box 30 satisfy the relationship of the second condition (D2<D4). Accordingly, as shown in FIG. 5A, the second R portion 27 of the pin 20 does not come into contact with the fourth R portion 37 of the box 30, and the second tapered surface 23a and the fourth tapered surface 33a smoothly come into contact with each other.

Figure 5B:
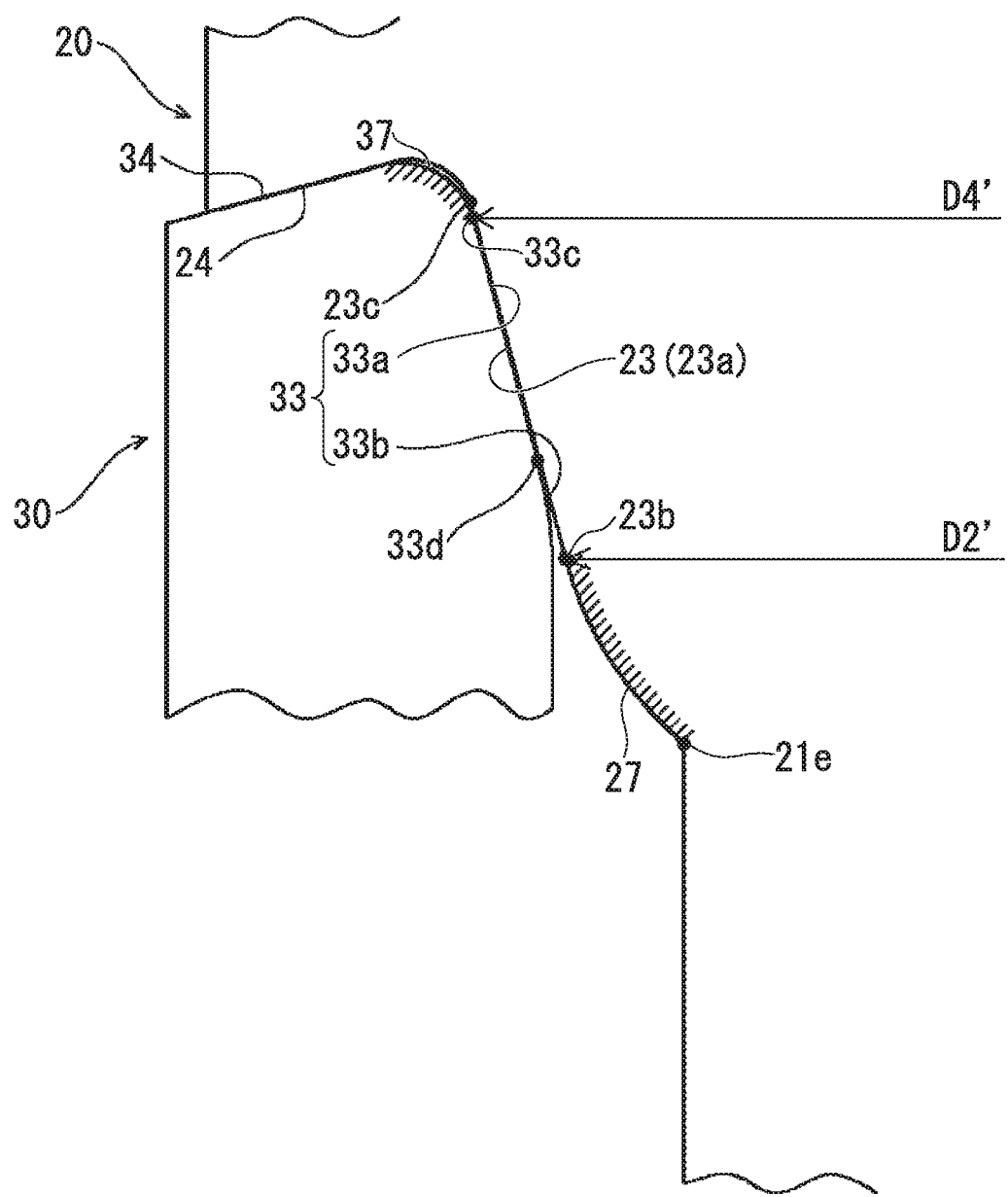
FIG. 5B is an enlarged view of FIG. 1C, and shows the base side of the pin.

FIG. 5B is an enlarged view which shows the state when the make-up between the pin 20 and the box 30 is completed, and shows the base side of the pin 20. Moreover, FIG. 5B is a view corresponding to FIG. 4B. As shown in FIG. 5B, in the state when the make-up is completed, a part or whole of the fourth seal portion 33 comes into close contact with the second tapered surface 23a over the entire circumference. Moreover, in the threaded connection 1 for a steel pipe, the abutment surface 24 of the pin 20 and the abutment surface 34 of the box 30 abut into contact with each other, and thus, the make-up between the pin 20 and the box 30 is completed.

In addition, in the state when the make-up is completed, since the second seal portion 23 and the fourth seal portion 33 interfere with each other in the radial direction, the diameters D2 and D4 in the state before the make-up do not necessarily coincide with diameters D2' and D4' in the state when the make-up is completed.

Moreover, in FIG. 5B, the second tapered surface 23a and the fourth tapered surface 33a come into contact with each other. However, at least one of the fourth tapered surface 33a and the second curvature surface 33b may come into contact with the second tapered surface 23a.

In addition, as described above, when the pin 20 and the box 30 are made-up, it is possible to use a make-up device referred to as a power tong.

As described above, in the threaded connection 1 for a steel pipe 1 according to the first embodiment, the R portions 26 and 27 of the pin 20 do not come into contact with the R portions 36 and 37 of the box 30, respectively. As a result, in the process in which the pin 20 is screwed into the box 30, the pipe axis (center) of the pin 20 and the pipe axis (center) of the box 30 align with each other, and thus, the screwing is smoothly performed. Accordingly, it is possible to prevent the humping of the make-up torque.

Moreover, when the R portions 26 and 27 of the pin 20 come into contact with the R portions 36 and 37 of the box 30, since the curvature surfaces come into contact with each other, the contact area is decreased. In this case, a high contact pressure is generated in the regions in which the R portions 26 and 27 of the pin 20 and the R portions 36 and 37 of the box 30 come into contact with each other, and thus, galling easily occurs. However, in the threaded connection 1, the contacts between the R portions 26 and 27 of the pin 20 and the R portions 36 and 37 of the box 30 can be avoided, and as a result, it is possible to prevent the galling. Accordingly, in the threaded connection 1, there is an advantage that the galling does not easily occur.

Any of an integral type or a coupling type can be applied to the threaded connection 1 according to the first embodiment. In the case of the integral type, both the upper pipe 2 and the lower pipe 3 are steel pipes. In the case of the coupling type, the upper pipe 2 is a steel pipe, and the lower pipe 3 is a coupling (short pipe).

Moreover, since the humping of the make-up torque easily occurs when steel pipes having large diameters are connected to each other, preferably, the threaded connection 1 according to the first embodiment is used to connect steel pipes having large diameters. For example, in the case of the integral type, preferably, the outer diameters of the main bodies (portions except for the pin and the box) of the upper pipe 2 (steel pipe) and the lower pipe 3 (steel pipe) are equal to or more than 190 mm, more preferably, equal to or more than 240 mm, and most preferably, equal to or more than 290 mm.

Moreover, the humping of the make-up torque easily occurs as the thickness of the box 30 is decreased. For example, in the state before the make-up begins, when the outer diameter of the box 30 of the lower pipe 3 is more than 100% and less than 104% with respect to the outer diameter of the body (the portion except for the pin 20 in the upper pipe 2) of the upper pipe 2, the humping of the make-up torque easily occurs. Accordingly, when the outer diameter of the box 30 of the lower pipe 3 is more than 100% and less than 104% with respect to the outer diameter of the body of the upper pipe 2, suppression effects with respect to the humping are increased by the threaded connection 1.

The upper limit of the outer diameter of each of the main bodies (the portion except for the pin 20 in the upper pipe 2 and the portion except for the box 30 in the lower pipe 3) of the upper pipe 2 and the lower pipe 3 is not particularly limited. However, in a case when used in oil-well pipes, a metal seal is not nearly used in a threaded connection for an oil-well pipe having a super large diameter (more than 600 mm) such as a conductor which is buried by a shallow depth. In consideration of this, the threaded connection 1 can be properly used in a steel pipe in which the outer diameter of the body is less than or equal to 600 mm.

Also in the coupling type, similarly, preferably, the outer diameter of the body of the upper pipe 2 (steel pipe) is equal to or more than 190 mm, more preferably, equal to or more than 240 mm, and most preferably, equal to or more than 290 mm.

Here, in general, dimension accuracy of the steel pipe may be decreased as the size (diameter, length, and the like) of the steel pipe is increased. In the case of steel pipes having large diameters, in the state before the pin 20 and the box 30 are made-up, the decrease in the dimension accuracy influences roundness in the seal portions (tapered surface) of the pin 20 and the box 30. Accordingly, when the threaded connection 1 according to the first embodiment is used to connect steel pipes having large diameters, in consideration of the roundness of each seal portion (each tapered surface), preferably, the diameters D1 and D2 of the pin 20 and the diameters D3 and D4 of the box 30 in the state before the pin 20 and the box 30 are made-up are properly designed.

Specifically, when differences between the diameters D1 and D2 of the pin 20 in the state before the make-up and the diameters D3 and D4 of the box 30 in the state before the make-up are small, effects of preventing the humping cannot be sufficiently obtained when the roundness is greatly decreased. Moreover, when surface treatment such as chemical conversion treatment or plating is performed on the pin 20 or the box 30, the effect of preventing the humping cannot be sufficiently obtained if the difference between the diameter D1 and the diameter D3 and the difference between the diameter D2 and the diameter D4 are not provided to be equal to or more than the thickness of the surface treatment. In addition, when the contact between the tapered surfaces starts, since there are many gaps between the male thread portion 21 and the female thread portion 31, it is possible to increase the effect of preventing the humping if a margin in the diameter difference is provided.

Meanwhile, if the differences between the diameters D1 and D2 of the pin 20 in the state before the make-up and the diameters D3 and D4 of the box 30 in the state before the make-up are set more than required, it is necessary to lengthen the tapered surface of the seal portion, and thus, the manufacturing cost is increased due to a wasteful design.

According to the above, preferably, the difference between the diameter D1 and the diameter D3, and the difference between the diameter D2 and the diameter D4 are more than 0% and less than or equal to 0.3% of the outer diameter of the body of the steel pipe (upper pipe 2), and more preferably, more than 0.05% and less than or equal to 0.2%.

The first embodiment shows the case where the seal portions (first seal portion 22 and second seal portion 23) are provided on the tip side and the base side of the pin 20 and the seal portions (third seal portions 32 and fourth seal portion 33) corresponding thereto are provided on the box 30. However, according to the sealing performance and the pressure resistance required in the threaded connection 1 for a steel pipe, the seal portion may be provided on either the front side (tip side) or the rear side (base side) of the region in which the tapered thread (male thread portion 21 or the female thread portion 31) is formed. That is, only any one of the first seal portion 22 and the second seal portion 23 may be provided, and according to this, the third seal portion 32 or the fourth seal portion 33 may be provided on the box 30.

Figure 6:
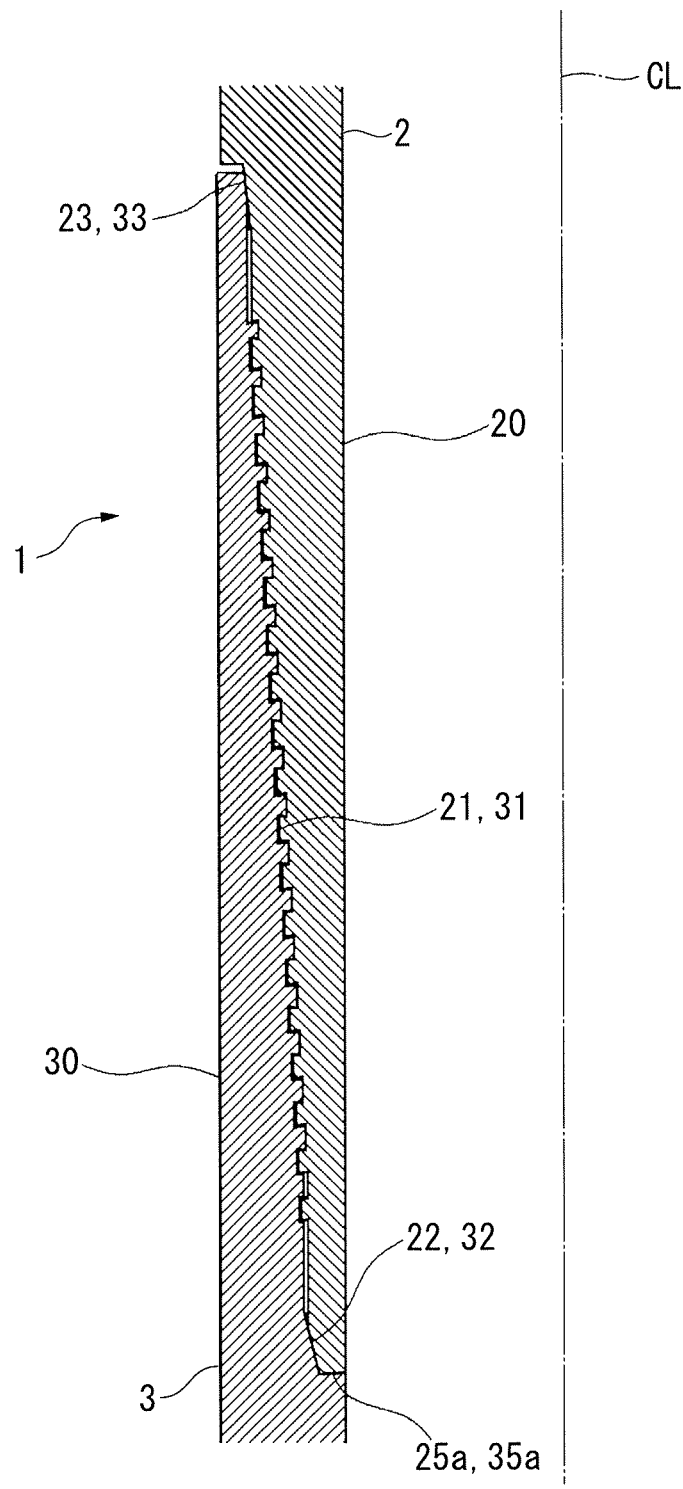
FIG. 6 is a longitudinal sectional view showing a modified example of the threaded connection for a steel pipe according to the first embodiment of the present invention.

In addition, the first embodiment shows the case where the abutment surface 24 of the pin 20 is provided on the base (the rear end of the pin 20) of the pin 20, and according to this, the abutment surface 34 of the box 30 is provided on the tip (the front end of the box 30) of the box 30. However, in consideration of the sealing performance and the pressure resistance required in the threaded connection 1 for a steel pipe, as shown in FIG. 6, the abutment surface 25a may be provided on the tip surface 25 of the pin 20, and according to this, the abutment surface 35a may be provided on the base surface of the box 30.

Second Embodiment

Next, a threaded connection 100 for a steel pipe according to a second embodiment of the present invention will be described. Moreover, the same reference numerals are assigned to the same components as the above-described components, and the descriptions thereof are omitted below.

Figure 7:
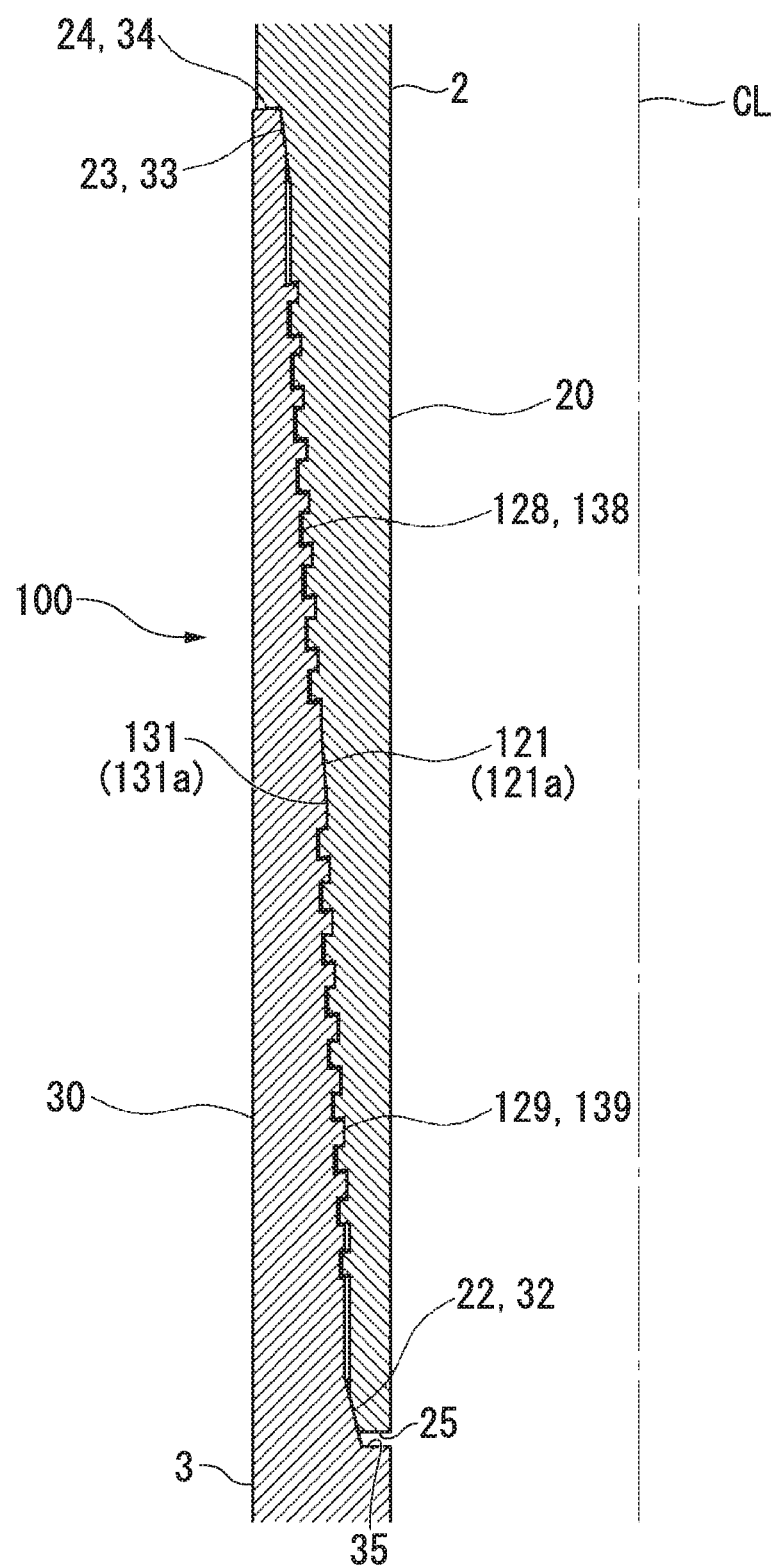
FIG. 7 is a longitudinal sectional view showing a threaded connection for a steel pipe according to a second embodiment of the present invention.

FIG. 7 is a longitudinal sectional view showing the threaded connection 100 for a steel pipe according to the second embodiment. In the first embodiment, only one region of the tapered thread is formed. However, in the second embodiment, as shown in FIG. 7, the male thread portion 21 of the pin 20 is divided into two along the pipe axis direction, and an upper male thread portion 128 and a lower male thread portion 129 are formed. Similarly, the female thread portion 31 of the box 30 is divided into two along the pipe axis direction, and an upper female thread portion 138 and a lower female thread portion 139 are formed. A fifth seal portion 121 is provided on a portion (on an intermediate portion) between the upper male thread portion 128 and the lower male thread portion 129, and a sixth seal portion 131 is provided on a portion between the upper female thread portion 138 and the lower female thread portion 139. Moreover, the fifth seal portion 121 and the sixth seal portion 131 are configured from a fifth tapered surface 121a and a sixth tapered surface 131a, respectively.

Compared to the first embodiment, in the threaded connection 100 for a steel pipe according to the second embodiment, since the fifth seal portion 121 and the sixth seal portion 131 serve as backup seals even when leak occurs in any one of the first seal portion 22, the second seal portion 23, the third seal portion 32, and the fourth seal portion 33, it is possible to further improve the sealing performance and the pressure resistance.

In addition, in the threaded connection 100 according to the second embodiment, the male threaded connection 21 of the pin 20 may be divided into three or more, and the female threaded portion 31 of the box 30 may be divided into three or more. In this case, a seal portion may be provided between the divided male thread portions 21, and according to this, a seal portion may be provided between the divided female thread portions 31.

In the above, embodiments of the present invention are described. However, the embodiments are presented as examples, and the scope of the present invention is not limited to the embodiments. In the embodiments, various aspects can be performed, and various omissions, replacements, and modification examples can be performed within a scope which does not depart from the gist of the invention. If the embodiments or the modification examples are included in claims or the gist of the invention, the embodiments or the modification examples are included in the scope equivalent to the inventions described in claims.

For example, a threaded connection in which the upper pipe 2 (first pipe) includes the box 30 and the lower pipe 3 (second pipe) includes the pin 20 may be adopted.

EXAMPLE

In order to confirm effects of the present invention, a steel pipe in which integral type threaded connections shown in Table 1 and Table 2 were configured was manufactured, and a test with respect to make-up between a pin and a box was performed using a make-up device. Characteristics with respect to a material and dimensions of the steel pipe are shown in Table 1.

TABLE 1

| | |
|---|---|
| Outer Diameter in Body of Steel Pipe (mm) | 406.4 |
| Thickness in Body of Steel Pipe (mm) | 16.66 |
| Grade of Steel Pipe | P110 Steel of API Standard (0.2% Proof Stress 758 MPa) |
| Thread Shape | Tapered Thread having Dovetail Shape |
| Thread Pitch | Double-Start Thread having 1.5 Thread Teeth Per Inch |
| Height of Load Flank Surface (Load Surface) of Male Thread Portion (mm) | 1.3 |
| Target of Contact Amount (Interference Amount) between Root of Male Thread Portion and Crest of Female Thread Portion (mm) | 0.1 |
| Taper Angle of Seal Portion (degree) | 5.7 |
| Curvature Radius of First R Portion (Front R Portion of Pin) (mm) | 0.6 |
| Curvature Radius of Second R Portion (Rear R Portion of Pin) (mm) | 8 |
| Curvature Radius of Third R Portion (Rear R Portion of Box) (mm) | 8 |
| Curvature Radius of Fourth R Portion (Front R Portion of Box) (mm) | 0.6 |

A dimension relationship between the diameter D1 of the front end in the first tapered surface of the pin and the diameter D3 of the front end in the third tapered surface of the box, and a dimension relationship between the diameter D2 of the front end in the second tapered surface of the pin and the diameter D4 of the front end in the fourth tapered surface of the box are shown in Table 2.

TABLE 2

| | D1-D3 (mm) | D2-D4 (mm) |
|---|---|---|
| Example | −0.15 | −0.45 |
| Comparative Example | 1.2 | 0.5 |

Figure 8:
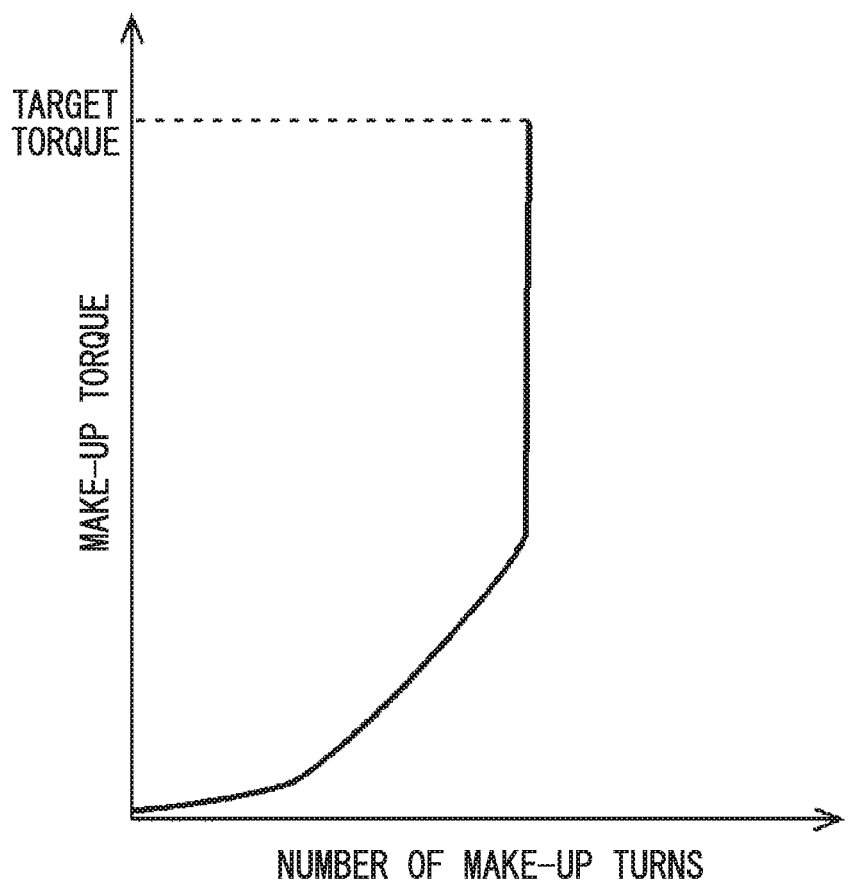
FIG. 8 is a schematic view showing a relationship between the number of make-up turns and a make-up torque in the threaded connection for a steel pipe according to the first embodiment of the present invention.
Figure 10:
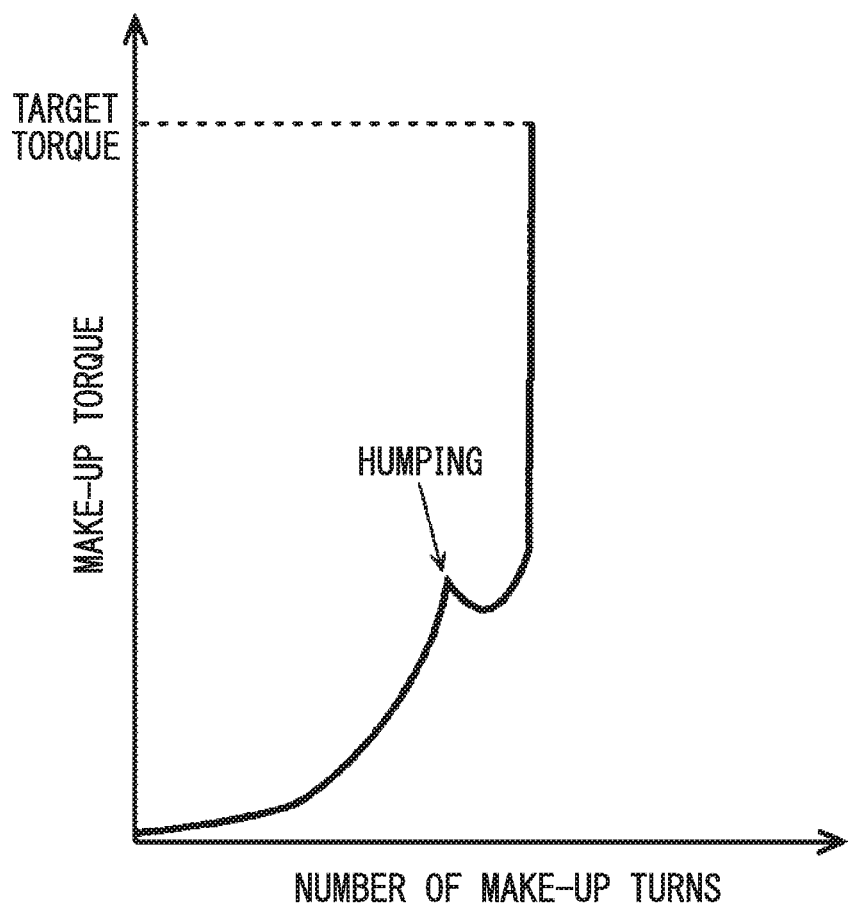
FIG. 10 is a schematic view showing the relationship between the number of make-up turns and the make-up torque in the threaded connection for a steel pipe in which the humping of the make-up torque is occurred.

In Example, in both the first seal portion and the second seal portion of the pin, since the diameters D1 and D2 of the front ends in the tapered surfaces of the pin were smaller than the diameters D3 and D4 of the front ends in the tapered surfaces of the box, respectively, as shown in FIG. 8, the humping of the make-up torque did not occur. In Comparative Example, in both the first seal portion and the second seal portion of the pin, since the diameters D1 and D2 of the front ends in the tapered surfaces of the pin were larger than the diameters D3 and D4 of the front ends in the tapered surfaces of the box, respectively, as shown in FIG. 10, the humping of the make-up torque occurred.

INDUSTRIAL APPLICABILITY

According to the present invention, it is possible to provide a threaded connection for a steel pipe capable of preventing humping of a make-up torque which is occurred when a pin and a box are made-up.

BRIEF DESCRIPTION OF THE REFERENCE SYMBOLS

1: threaded connection for steel pipe (first embodiment)
2: upper pipe (first pipe)
3: lower pipe (second pipe)
20: pin
21: male thread portion
22: first seal portion (seal portion of pin)
22a: first tapered surface (tapered surface of first seal portion)
22b: first curvature surface (curvature surface of first seal portion)
22c: front end of first tapered surface
22d: rear end of first tapered surface
23: second seal portion (seal portion of pin)
23a: second tapered surface (tapered surface of second seal portion)
23b: front end of second tapered surface
23c: rear end of second tapered surface
24: abutment surface of pin (base surface of pin)
25: tip surface of pin
26: first R portion (front R portion of pin)
27: second R portion (rear R portion of pin)
30: box
31: female thread portion
32: third seal portion (seal portion of box)
32a: third tapered surface (tapered surface of third seal portion)
32b: front end of third tapered surface
32c: rear end of third tapered surface
33: fourth seal portion (seal portion of box)
33a: fourth tapered surface (tapered surface of fourth seal portion)
33b: second curvature surface (curvature surface of fourth seal portion)
33c: front end of fourth tapered surface
33d: rear end of fourth tapered surface
34: abutment surface of box (tip surface of box)
35: base surface of box 36: third R portion (rear R portion of box)
37: fourth R portion (front R portion of box)
100: threaded connection for steel pipe (second embodiment)
121: fifth seal portion (seal portion of pin)
121a: fifth tapered surface (tapered surface of fifth seal portion)
128: upper male thread portion
129: lower male thread portion
131: sixth seal portion (seal portion of box)
131a: sixth tapered surface (tapered surface of sixth seal portion)
138: upper female thread portion
139: lower female thread portion
D1: diameter of front end of first tapered surface (minimum diameter of first tapered surface)
D2: diameter of front end of second tapered surface (minimum diameter of second tapered surface)
D3: diameter of front end of third tapered surface (maximum diameter of third tapered surface)
D4: diameter of front end of fourth tapered surface (maximum diameter of fourth tapered surface)
CL: pipe axis
Pin: inner pressure
Pout: outer pressure

The invention claimed is:

1. A set of a first pipe and a second pipe having a threaded connection, wherein:
the second pipe comprises a box which is an opening end of the second pipe;
the first pipe comprises a truncated cone shaped pin which is an end of the first pipe and is configured to be inserted into the box;
the pin includes a male thread portion which is a tapered thread, and a seal portion which includes a tapered surface;
the box includes a female thread portion which is a tapered thread, and a seal portion which includes a tapered surface;
a minimum diameter of the tapered surface of the pin is smaller than a maximum diameter of the tapered surface of the box; and
the first pipe and the second pipe have shapes such that a positional relationship between the male thread portion of the first pipe and the female thread of the second pipe shifts from a first state to a second state during make-up by screwing,
the first state being a state that the seal portion of the pin and the seal portion of the box contact with each other but a root of the male thread portion and a crest of the female thread portion does not contact with each other, and
the second state being a state that a root of the male thread portion and a crest of the female thread portion contact with each other.

2. The set of the first pipe and the second pipe according to claim 1,
wherein the seal portion of the pin is provided on each of a tip side of the pin from the male thread portion and a base side of the pin from the male thread portion.

3. The set of the first pipe and the second pipe according to claim 1,
wherein the pin further includes an R portion which is provided on a tip side of the pin from the seal portion of the pin, and
the box further includes an R portion which is provided on a tip side of the box from the seal portion of the box.

4. The set of the first pipe and the second pipe according to claim 1,
wherein the male thread portion is divided into a plurality of male thread portions along a pipe axis direction of the first pipe, and
the seal portion of the pin is further provided between the male thread portions adjacent to each other in the pipe axis direction.

5. The set of the first pipe and the second pipe according to claim 1,
wherein the pin further includes an abutment surface which is provided on a tip or a base of the pin.

6. The set of the first pipe and the second pipe according to claim 1,
wherein each of the first pipe and the second pipe is a steel pipe.

7. The set of the first pipe and the second pipe according to claim 6,
wherein an outer diameter of a body of the first pipe is 190 mm or more,
an outer diameter of a body of the second pipe is 190 mm or more, and
in the first state, an outer diameter of the box is more than 100% of the outer diameter of the body of the first pipe, and is less than 104% of the outer diameter of the body of the first pipe.

8. The set of the first pipe and the second pipe according to claim 7,
wherein in the first state, a difference between the minimum diameter of the tapered surface of the pin and the maximum diameter of the tapered surface of the box is more than 0% of the outer diameter of the body of the first pipe, and is 0.3% or less of the outer diameter of the body of the first pipe.

9. The set of the first pipe and the second pipe according to claim 1,
wherein the first pipe is a steel pipe, and
the second pipe is a coupling.

* * * * *